United States Patent
Kang et al.

(10) Patent No.: US 10,305,715 B2
(45) Date of Patent: *May 28, 2019

(54) METHOD AND APPARATUS OF PRIMARY CELL INDICATION FOR ENHANCED CONTROL CHANNEL DEMODULATION

(71) Applicant: LG ELECTRONICS INC., Seoul (KR)

(72) Inventors: Ji Won Kang, Anyang-si (KR); Jin Young Chun, Anyang-si (KR); Ki Tae Kim, Anyang-si (KR); Su Nam Kim, Anyang-si (KR); Bin Chul Ihm, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/668,093

(22) Filed: Aug. 3, 2017

(65) Prior Publication Data
US 2017/0359209 A1    Dec. 14, 2017

Related U.S. Application Data

(63) Continuation of application No. 14/005,735, filed as application No. PCT/KR2012/008303 on Oct. 12, 2012, now Pat. No. 9,762,425.
(Continued)

(51) Int. Cl.
*H04W 24/00* (2009.01)
*H04L 27/26* (2006.01)
(Continued)

(52) U.S. Cl.
CPC ......... *H04L 27/2649* (2013.01); *H04B 7/024* (2013.01); *H04B 7/0456* (2013.01);
(Continued)

(58) Field of Classification Search
None
See application file for complete search history.

(56) References Cited

U.S. PATENT DOCUMENTS

2008/0291892 A1    11/2008   Luo
2009/0088148 A1    4/2009    Chung et al.
(Continued)

FOREIGN PATENT DOCUMENTS

CN    101507341 A    8/2009
CN    101771646 A    7/2010
(Continued)

OTHER PUBLICATIONS

3GPP TSG RAN WG1 Meeting #66 bis, R1-113236, "Design Consideration for E-PDCCH", Research in Motion, UK Limited, Agenda Item: 7.5.5.2, Oct. 10-14, 2011.
(Continued)

*Primary Examiner* — Sithu Ko
(74) *Attorney, Agent, or Firm* — Birch, Stewart, Kolasch & Birch, LLP

(57) ABSTRACT

A method is provided for receiving a downlink control channel in a wireless communication system. A user equipment performs a blind decoding in a first search space on the cell to find a first Physical Downlink Control Channel (PDCCH). The user equipment receives a Radio Resource Control (RRC) message including information on a second search space for monitoring a second PDCCH and identity information, and performs a blind decoding in the second search space on the cell to find the second PDCCH. The first PDCCH is demodulated based on a physical cell identity of the cell, and the second PDCCH is demodulated based on the identity information instead of the physical cell identity.

10 Claims, 13 Drawing Sheets

Related U.S. Application Data

(60) Provisional application No. 61/548,233, filed on Oct. 18, 2011.

(51) Int. Cl.

| | | |
|---|---|---|
| *H04L 5/00* | (2006.01) | |
| *H04L 25/03* | (2006.01) | |
| *H04B 7/024* | (2017.01) | |
| *H04B 7/0456* | (2017.01) | |
| *H04B 7/06* | (2006.01) | |
| *H04L 1/00* | (2006.01) | |

(52) U.S. Cl.
CPC ......... *H04B 7/0617* (2013.01); *H04L 1/0046* (2013.01); *H04L 1/0072* (2013.01); *H04L 5/0037* (2013.01); *H04L 5/0053* (2013.01); *H04L 25/03904* (2013.01); *H04L 25/03949* (2013.01); *H04L 27/2666* (2013.01); *H04L 27/2602* (2013.01)

(56) References Cited

U.S. PATENT DOCUMENTS

| | | | |
|---|---|---|---|
| 2009/0213802 A1 | 8/2009 | Miki et al. | |
| 2010/0303011 A1 | 12/2010 | Pan et al. | |
| 2010/0331030 A1 | 12/2010 | Nory et al. | |
| 2011/0075624 A1* | 3/2011 | Papasakellariou | H04L 5/0053 370/329 |
| 2011/0199986 A1* | 8/2011 | Fong | H04L 5/0035 370/329 |
| 2011/0256868 A1* | 10/2011 | Nogami | H04J 11/0069 455/435.1 |
| 2011/0268062 A1 | 11/2011 | Ji et al. | |
| 2011/0268070 A1 | 11/2011 | Guan et al. | |
| 2012/0282936 A1* | 11/2012 | Gao | H04L 5/0023 455/450 |
| 2012/0294272 A1 | 11/2012 | Han et al. | |
| 2012/0307759 A1 | 12/2012 | Miki | |
| 2013/0051214 A1* | 2/2013 | Fong | H04W 24/10 370/216 |
| 2014/0192786 A1* | 7/2014 | Skov | H04W 56/0015 370/336 |

FOREIGN PATENT DOCUMENTS

| | | |
|---|---|---|
| EP | 2 302 830 A2 | 3/2011 |
| JP | 2011-517259 A | 5/2011 |
| JP | 2011-142599 A | 7/2011 |
| JP | 2013-518502 A | 5/2013 |
| KR | 10-2011-0090784 A | 8/2011 |
| WO | WO 2009/129343 A1 | 10/2009 |
| WO | WO 2011/038243 A2 | 3/2011 |
| WO | WO 2011/093644 A2 | 8/2011 |

OTHER PUBLICATIONS

3GPP TSG-RAN WG1 #64, R1-110649, "Aspects on Distributed RRUs with Shared Cell-ID for Heterogeneous Deployments", Ericsson, ST-Ericsson, Agenda Item: 6.3.1.2, Feb. 21-Feb. 25, 2011.

3GPP TSG-RAN WG1 Meeting #66, R1-112315, "On control signaling enhancements", Renesas Mobile Europe Ltd., Agenda item: 6.6.2.2, Aug. 22-26, 2011.

LG-Ericsson, "Consideration on E-PDCCH multiplexing and signalling", 3GPP TSG RAN WG1 #66bis, Agenda Item: 7.5.5.2, Zhuhai, China, Oct. 10-14, 2011, 3 pages, R1-113372.

Motorola Mobility, "Enhanced control channels for LTE Rel-11", 3GPP TSG RAN WG1 #66bis, Agenda Item: 7.5.5.2, Zhuhai, China, Oct. 10-15, 2011, 3 pages, R1-113261.

\* cited by examiner

FIG. 5
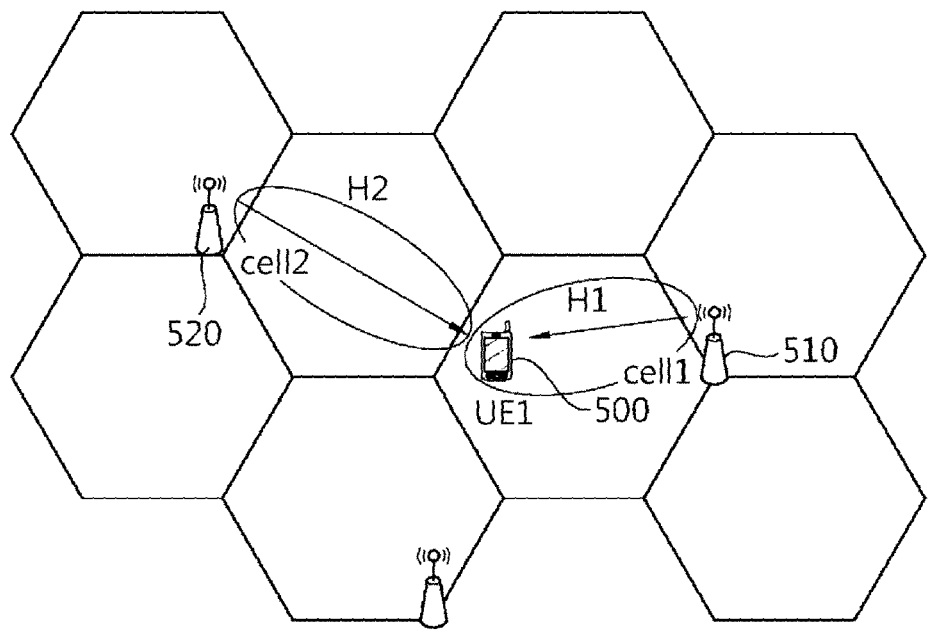
(A) CoMP:Joint transmission
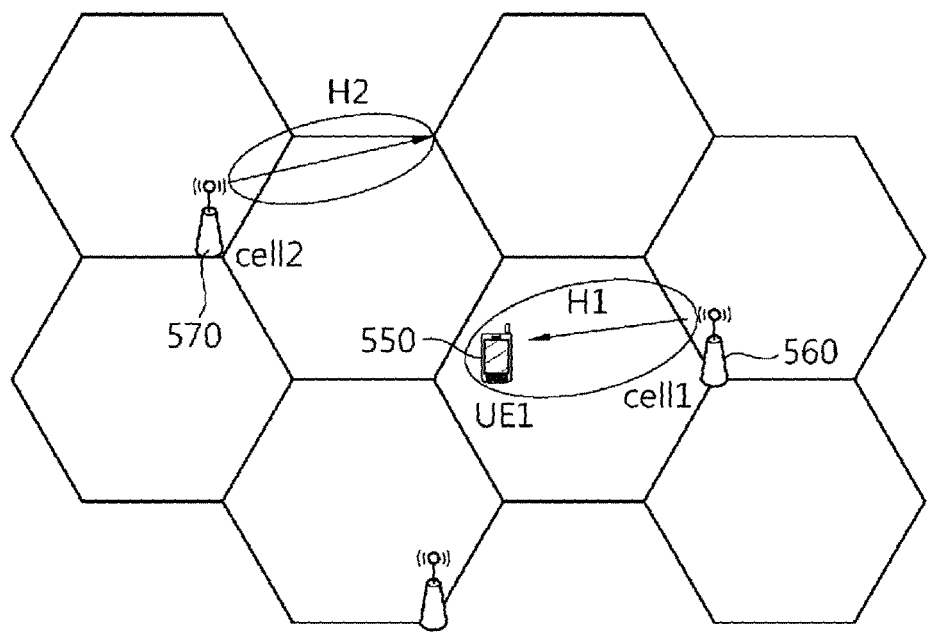
(B) CoMP:CS/CB

METHOD AND APPARATUS OF PRIMARY CELL INDICATION FOR ENHANCED CONTROL CHANNEL DEMODULATION

CROSS-REFERENCE TO RELATED APPLICATIONS

This Application is a Continuation of U.S. patent application Ser. No. 14/005,735 filed on Sep. 17, 2013 (now U.S. Pat. No. 9,762,425 issued on Sep. 12, 2017), which is the National Phase of PCT International Application No. PCT/KR2012/008303 filed on Oct. 12, 2012, which claims the benefit under 35 U.S.C. § 119(e) to U.S. Provisional Application No. 61/548,233 filed on Oct. 18, 2011, all of which are hereby expressly incorporated by reference into the present application.

BACKGROUND OF THE INVENTION

Field of the Invention

The present invention relates to wireless communication, and more specifically to a method and apparatus for demodulating control information.

Discussion of the Related Art

More and more data is recently transmitted over a wireless communication network due to appearance of various devices, such as smartphones or tablet PCs, which require machine-to-machine (M2M) communication and transmission of a large amount of data. More interest is oriented toward carrier aggregation and cognitive radio technologies that enable effective use of a broader frequency bandwidth to satisfy transmission of a large amount of data and multi-antenna technologies and multi-base station cooperative technologies that may raise data capacity in a limited frequency range.

Further, wireless communication networks have been evolving in such a manner that the density of nodes to which a user may gain access increases. Here, the "nodes" occasionally mean antennas or antenna groups which are spaced apart at a predetermined distance in a distributed antenna system (DAS), but are not limited to such concept, and may be expanded in meaning. That is, a node may be a pico-cell base station (PeNB), a home base station (HeNB), an RRH (remote radio head), an RRU (remote radio unit), or a relay. When having higher density of nodes, the wireless communication system may show higher system performance thanks to inter-node cooperation.

In other words, rather than when operating as an independent base station (Base Station (BS), Advanced BS (ABS), Node-B (NB), eNode-B (eNB), Access Point (AP), etc.) without cooperation from another node, when the transmission/reception is managed by a control station to thereby operate as an antenna or antenna group in a cell, each node may exhibit much higher system performance. Hereinafter, a wireless communication system including a plurality of nodes is referred to as multi-node system.

Not only when defined as an antenna group having a predetermined interval, but also when defined as an antenna group that has nothing to do with the interval, the nodes may apply. For example, it can be seen that a base station including class polarized antennas is constituted of a node having an H-pol antenna and a node having a V-pol antenna.

In the multi-node system, different nodes from each other for each terminal may transmit a signal to the terminal, and a plurality of nodes may be set. At this time, different reference signals for each node may be transmitted. In such case, the terminal may measure a channel state between each node and the terminal based on the plurality of reference signals and may periodically or aperiodically feed back channel state information.

SUMMARY OF THE INVENTION

An object of the present invention is to provide a method of demodulating control information using a cell ID (identification).

Another object of the present invention is to provide an apparatus that performs a method of demodulating control information using a cell ID (identification).

To achieve the above objects, according to an aspect of the present invention, a method for receiving control information in a multi-distributed node system may include demodulating a first cell identification (ID) based on a synchronization signal (SS), demodulating information indicating a second cell ID based on a radio resource control (RRC) message and demodulating enhanced physical downlink control channel (e-PDCCH) based on the second cell ID, wherein the first cell ID is an indication shared by a plurality of neighboring nodes and wherein the second cell ID is an indication identifying the plurality of neighboring nodes. The information indicating the second cell ID may be included in configuration information of the e-PDCCH. The demodulating information indicating the second cell ID may include demodulating a cell ID of a received channel state information (CSI)-reference signal (RS) based on the RRC message, demodulating a primary physical cell ID (PPCI) indication of the CSI-RS based on the RRC message and setting the second cell ID equal to the cell ID of the CSI-RS, wherein the cell ID of CSI-RS indicates a node transmitting the CSI-RS and wherein the PPCI indication indicates whether the second cell ID is equal to the cell ID of the CSI-RS. The method for receiving control information in a multi-distributed node system may further include demodulating physical downlink shared channel (PDSCH) based on the CSI-RS, wherein the PDSCH is generated with a cell ID same as the cell ID of the CSI-RS. The demodulating information indicating the second cell ID may include demodulating a cell ID of a CSI-RS located predetermined resource element based on the RRC message and setting the second cell ID equal to the cell ID of the CSI-RS, wherein the cell ID of the CSI-RS indicates a node transmitting the CSI-RS. The method for receiving control information in a multi-distributed node system may further include demodulating physical downlink shared channel (PDSCH) based on the CSI-RS, wherein the PDSCH is generated with a cell ID same as the cell ID of the CSI-RS.

To achieve the above objects, according to an aspect of the present invention, a wireless device configured to receive control information in a multi-distributed node system, the wireless device may include a processor configured to demodulate a first cell identification (ID) based on a synchronization signal (SS) and demodulate information indicating a second cell ID based on a radio resource control (RRC) message and a transceiver configured to demodulate enhanced physical downlink control channel (e-PDCCH) based on the second cell ID, wherein the first cell ID is a indication shared by a plurality of neighboring nodes and wherein the second cell ID is a indication identifying the plurality of neighboring nodes. The information indicating the second cell ID may be included in configuration information of the e-PDCCH. The processor may further configured to demodulate information indicating the second cell ID by demodulating a cell ID of a received channel state information (CSI)-reference signal (RS) based on the RRC message and demodulating a primary physical cell ID (PPCI) indication of the CSI-RS based on the RRC message; and setting the second cell ID equal to the cell ID of the CSI-RS, wherein the cell ID of the CSI-RS indicates a node transmitting the CSI-RS and wherein the PPCI indication indicates whether the second cell ID is equal to the cell ID of the CSI-RS. The processor may be further configured to demodulate physical downlink shared channel (PDSCH) based on the CSI-RS, wherein the PDSCH is generated with a cell ID same as the cell ID of the CSI-RS. The processor may be further configured to demodulate physical downlink shared channel (PDSCH) based on the CSI-RS, wherein the PDSCH is generated with a cell ID same as the cell ID of the CSI-RS. The processor may be further configured to demodulate information indicating the second cell ID by demodulating a cell ID of a CSI-RS located predetermined resource element based on the RRC message; and setting the second cell ID equal to the cell ID of the CSI-RS, wherein the cell ID of the CSI-RS indicates a node transmitting the CSI-RS. The processor may be further configured to demodulate physical downlink shared channel (PDSCH) based on the CSI-RS. The PDSCH is generated with a cell ID same as the cell ID of the CSI-RS.

As described above, the control channel demodulating method and apparatus using a primary cell ID according to an embodiment of the present invention may receive control information transmitted from at least one node having a same virtual cell ID as the primary cell ID. Accordingly, a wireless device may receive the control information selectively in distributed node system using the virtual cell ID and the primary cell ID.

BRIEF DESCRIPTION OF THE DRAWINGS

FIG. 5 is a conceptual view illustrating a data transmission method using CoMP (coordinated multipoint transmission).

DETAILED DESCRIPTION OF THE INVENTION

The following technologies may be used in various multiple access schemes, such as CDMA (code division multiple access), FDMA (frequency division multiple access), TDMA (time division multiple access), OFDM (orthogonal frequency division multiple access), or SC-FDMA (single carrier-frequency division multiple access).

CDMA may be implemented as a radio technology, such as UTRA (Universal Terrestrial Radio Access) or CDMA2000. TDMA may be implemented as a radio technology, such as GSM (Global System for Mobile communications)/GPRS (General Packet Radio Service)/EDGE (Enhanced Data Rates for GSM Evolution). OFDMA may be implemented as a radio technology, such as IEEE (Institute of Electrical and Electronics Engineers) 802.11 (Wi-Fi), IEEE 802.16 (WiMAX), IEEE 802.20, or E-UTRA (Evolved UTRA). UTRA is part of UMTS (Universal Mobile Telecommunications System). 3GPP (3rd Generation Partnership Project) LTE (Long Term Evolution) is part of E-UMTS (Evolved UMTS) using E-UTRA, and adopts OFDMA for downlink and SC-FDMA for uplink. LTE-A (Advanced LTE) is an evolution of LTE.

Figure 1:
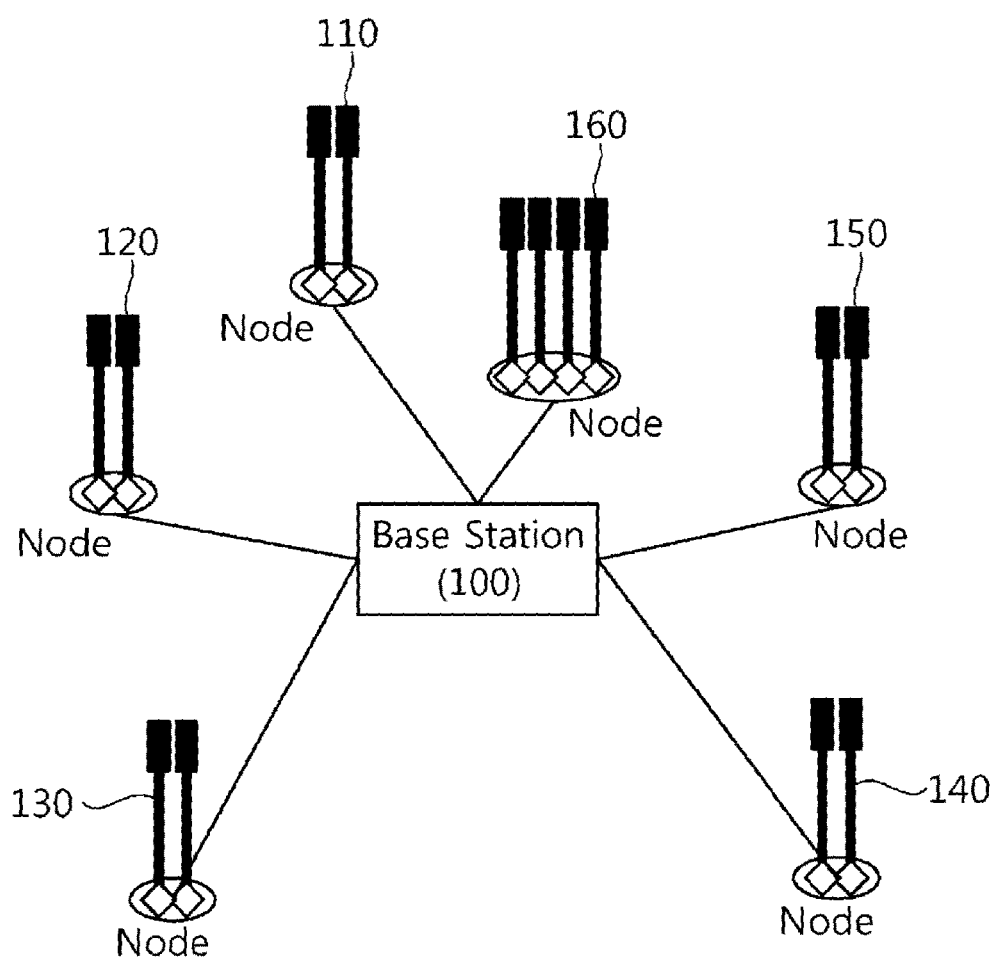
FIG. 1 is a conceptual view illustrating a single cell multi-distributed node system.

FIG. 1 is a conceptual view illustrating a single cell multi-distributed node system.

Referring to FIG. 1, in the single cell multi-distributed node system, the transmission/reception of each node 110, 120, 130, 140, 150, and 160 is managed by a single base station controller 100 and so may operate as part of one cell.

Hereinafter, in an embodiment of the present invention, a node generally refers to an antenna group (which may physically correspond to RRH (Remote Radio Head) or RRU (Remote Radio Unit)) spaced apart by a predetermined interval or more from a DAS (Distributed Antenna System). However, as used herein, the node may be construed as some antenna group irrespective of a physical interval. For example, according to an embodiment of the present invention, a base station consisting of cross polarized antennas may be referred to as being constituted of a node including an H-pol antenna and a node including a V-pol antenna. A node may be not an antenna group, but a base station, such as a pico-cell base station (PeNB) or a home base station (HeNB).

Further, as used herein, the 'node' is not restricted to a node in the physical point of view and may be expanded as a node in the logical point of view. The 'node in the logical point of view' means a transmission pilot signal that is recognized as a node by a terminal. For example, an LTE terminal may recognize configuration information of a node through CRS (Cell-specific Reference Signal) or CSI-RS (Channel State Information Reference Signal) port(s). Accordingly, a node logically recognized by a terminal may be different from an actual physical node. For example, in a cell where N CRS ports are transmitted, an LTE terminal may recognize that this cell is constituted of one node having N transmission antennas. However, this cell may have various physical node configurations. For example, in the cell, two nodes each may transmit N/2 CRS ports. As another example, a number of nodes having N transmission antennas may transmit CRS ports in an SFN (Single Frequency Network) style.

At last, the relationship between a physical node and a logical node may be transparent in light of a terminal, and the terminal may thus recognize the node in the logical point of view and may perform transmission/reception processing. In an LTE-A system, a logical node may be recognized as one CSI-RS resource (or pattern). For example, if a number of CSI-RS resources are set for a terminal, the terminal may recognize each CSI-RS resource as one logical node and may perform transmission/reception processing.

Hereinafter, an antenna according to an embodiment of the present invention may be also referred to as an antenna port, a virtual antenna, or antenna group, as well as a physical antenna.

In a multi-distributed multi-node system, a terminal should perform coherent demodulation on various downlink physical channels. For the terminal to perform coherent demodulation, downlink channel estimation is needed. The terminal may estimate the downlink channel by inserting a reference symbol known to the terminal into an OFDM time-frequency grid (or resource grid). Such reference symbol may be referred to as 'downlink reference symbol' or 'reference symbol'. The following reference symbols may be used:

(1) Cell-specific reference signal (CRS) may be transmitted over each downlink subframe and all resource blocks and may cover all cell bandwidths. In case a transmission mode is 7, 8, or 9, the CRS may be used as a reference signal for coherent demodulation of a signal transmitted through physical channels other than a PMCH (physical multicast channel) and a PDSCH (physical downlink shared channel). The situation where the transmission mode is 7, 8 or 9 refers to when non-codebook-based precoding is done.

Further, the CRS may be used for the terminal to obtain CSI (Channel-State Information), and the terminal may select a cell and may determine whether handover is performed based on the CRS.

(2) Demodulation reference signal (DM-RS) may be also defined as UE-specific reference signal. In case the transmission mode is 7, 8 or 9, the DM-RS may be used for the terminal to perform channel measurement on a PDSCH (Physical Downlink Shared Channel). The term "UE-specific" means that each demodulation reference signal (DM-RS) is used for channel measurement by a single terminal. That is, the DM-RS may be transmitted through a resource block transmitted to a specific terminal through the PDSCH.

(3) CSI reference signal (CSI-RS) refers to a reference signal used to obtain channel-state information (CSI). The CSI-RS has very low time/frequency density and so has a low overhead compared to the above-described CRS.

(4) MBSFN reference signal is used for channel measurement for coherent demodulation upon transmission of an MCH (multicast channel) using an MBSFN (multicast-broadcast single frequency network).

(5) Positioning reference signal is a reference signal used for enhancing LTE positioning functionality. This reference signal may be used to perform terminal measurement in a plurality of LTE cells so as to measure the geographical position of the terminal. In a specific cell, the positioning reference signal may be used at a position of an empty resource element in an adjacent cell so that a high SIR (Signal to Interference Ratio) may be obtained.

Hereinafter, according to an embodiment of the present invention, a method of performing channel estimation using the CSI-RS in a multi-node distributed system is described.

Figure 2:
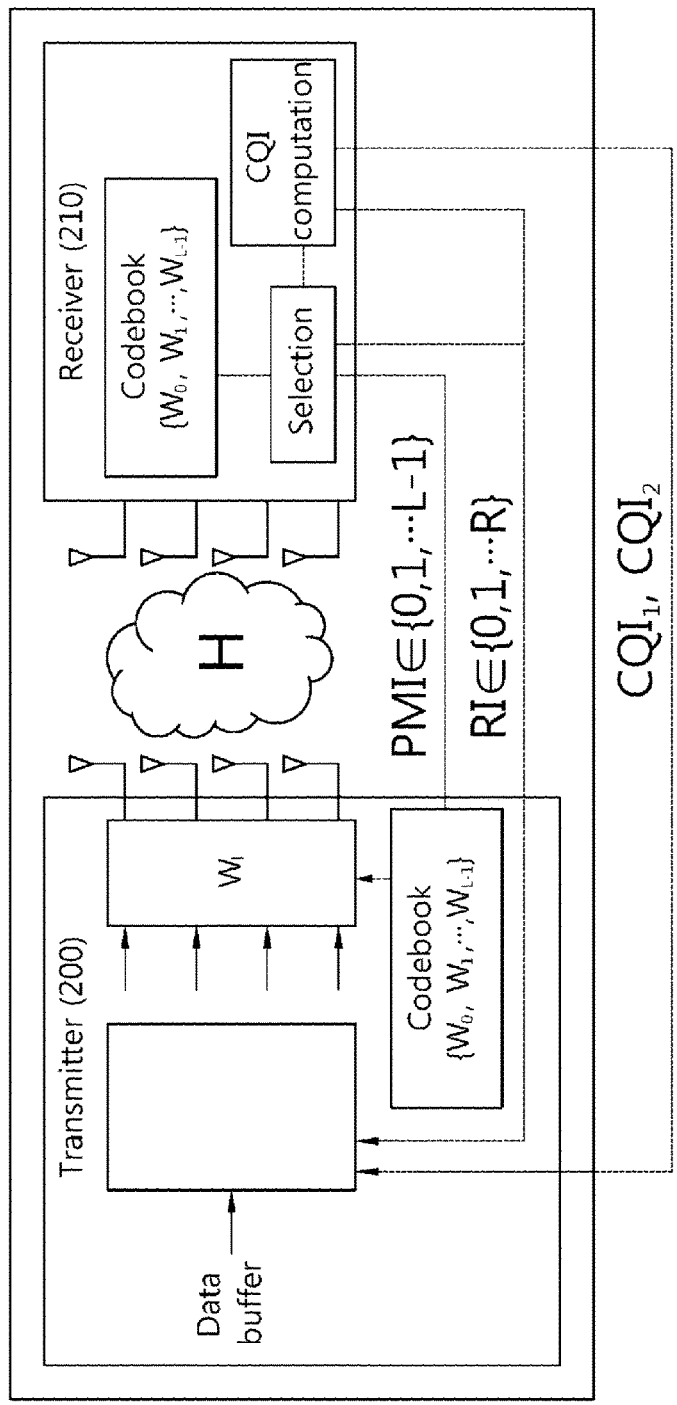
FIG. 2 is a conceptual view illustrating the transmission of the CSI-RS and the feedback of CSI measured by a terminal.

FIG. 2 is a conceptual view illustrating the transmission of the CSI-RS and the feedback of CSI measured by a terminal.

Referring to FIG. 2, a receiver 210 may feed channel information produced based on the CSI-RS transmitted from a transmitter 200 back to the transmitter 200 based on parameters, such as RI (rank index), PMI (precoding matrix index), and CQI (channel quality indicator). The parameters, such as RI, PMI, and CQI, which indicate channel information, may be referred to as CSI (channel state information).

(1) RI (rank index) provides recommendation for a transmission rank to be used to the transmitter 200. That is, the RI may provide information on the number of layers used for downlink transmission to the transmitter 200.

(2) PMI (precoding matrix index) may be used as a value that indicates a precoder matrix used for downlink transmission. The precoder matrix may be determined by estimating the number of layers indicated by the RI.

(3) CQI (channel-quality indication) may provide information on the highest modulation coding scheme to the transmitter 200.

As the feedback information of the CSI-RS transmitted from the transmitter 200, the receiver 210 may transmit RI, PMI, and CQI, which are information indicating the channel state, to the transmitter 200, thereby reporting the channel state.

Since the above-described CRS is also a reference signal that may be used to obtain the channel state information, the CRS and the CSI-RS may overlap in responsibility. The CSI-RS may be used to back up the CRS that is a preexisting reference signal for the following two reasons:

(1) In LTE release 8, up to four reference signal might be provided for one cell. However, in LTE release 10, one base station supports eight transmission antennas, and thus, downlink spatial multiplexing is possible for up to 8 layers. For such reason, rather than the CRS that is a reference signal that has been already used in LTE release 8, the CSI-RS may be used as a reference signal for expanding CSI capability.

(2) The time-frequency density of the existing CRS is high because it was set to be able to perform channel measurement in the circumstance where the channel changes very quickly. Accordingly, the CRS operates as high overhead. On the contrary, the CSI-RS is a reference signal targeting only the CSI, and thus has low time-frequency density and provides relatively low overhead compared to the CRS. Accordingly, rather than expanding the CRS that is an existing reference signal, the CSI-RS with low time-frequency density and low overhead may be defined and used as a new type of a reference signal.

One cell may use 1, 2, 4 or 8 CSI-RSs on a per-resource block pair basis. The CSI-RS structure (or CSI-RS configuration) which represents a structure where CSI-RSs are arranged in a resource grid may vary depending on the number of CSI-RSs used in one cell. For example, in case one CSI-RS is used in a resource block pair, the CSI-RS may have 40 different combinations.

The resource block pair is a unit of a resource, which includes two resource blocks, and one resource block may be a unit of a resource, which includes 12 subcarriers on the frequency axis and 7 OFDM symbols on the time axis.

Figure 3:
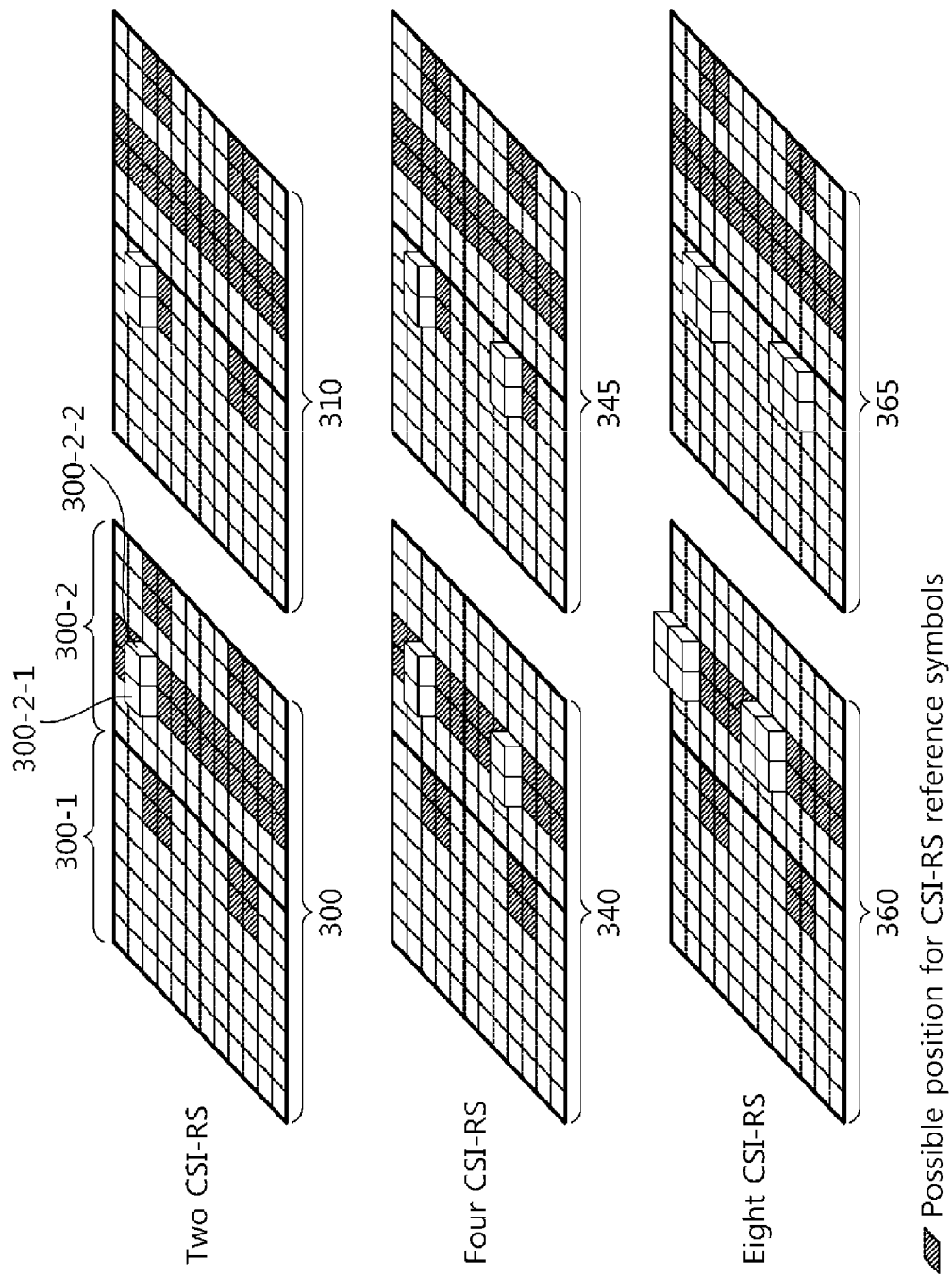
FIG. 3 is a conceptual view illustrating the position of CSI-RSs in a resource block pair according to the number of the CSI-RSs.

FIG. 3 is a conceptual view illustrating the position of CSI-RSs in a resource block pair according to the number of the CSI-RSs.

Referring to FIG. 3, the resource block pair 300 and 310 uses two CSI-RSs. The hatched portions refer to where the CSI-RSs may be positioned on the resource grid.

For example, two CSI-RSs 300-2-1 and 300-2-2 may be positioned on two consecutive reference elements in one resource block 300-2 on the time axis. The two CSI-RSs 300-2-1 and 300-2-2, respectively, may use orthogonal cover codes (OCCs) so that the CSI-RSs do not interference with each other. Two CSI-RSs may be positioned on the resource elements marked with hatching, and in case two CSI-RSs are used in one resource block pair, two combinations may be present in the resource block pair.

Referring back to FIG. 3, 1) an example where four CSI-RSs are used in one resource block pair 340 or 345 and 2) an example where eight CSI-RSs are used in one resource block pair 360 or 365 are shown.

In case four CSI-RSs are used, 10 different CSI-RS structure combinations may be present in the resource block pair, and in case eight CSI-RSs are used, five different CSI-RS structure combinations may be present in the resource block pair.

In case one CSI-RS is used in the resource block pair, the same CSI-RS structure as when two CSI-RSs are used may be provided like the resource pair block 300 and 310 shown in FIG. 1.

In light of time domain, a period at which the CSI-RS is transmitted may be various from 5 ms (every fifth subframe) to 80 ms (every eighth frame). In case one CSI-RS is transmitted every 5 ms, the overhead that occurs because the CSI-RS is used may be 0.12%. To avoid interference with an adjacent cell, a subframe where the CSI-RS may be made to have a different value from that of the adjacent cell even in the time domain.

Although in FIG. 3 the CSI-RS is transmitted on one resource block in the frequency domain, the CSI-RS may be transmitted on all the resource blocks in the frequency domain, so that the CSI-RS may be transmitted through all the cell bandwidths.

Turning back to FIG. 3, as described above, the CSI-RS may be also used at the position of a resource element different from the current position of the CSI-RS. Among resource elements that correspond to potential positions of the CSI-RS, a resource element that is not used for the CSI-RS may be used for transmission of data symbols.

However, as another method, a resource element corresponding to a potential CSI-RS position may be used as a muted CSI-RS (or zero power CSI-RS). The muted CSI-RS is the same as a general CSI-RS structure but differs from the general CSI-RS structure in that nothing is transmitted at the position of the corresponding resource element.

In case a CSI-RS is transmitted from an adjacent cell, the muted CSI-RS of the current cell may be a "transmission hole", which may be used for the following two purposes:

(1) Enables a terminal to receive a CSI-RS of an adjacent cell without being influenced by transmission from its cell. The channel information may be obtained by receiving the CSI-RS of the adjacent cell. The channel information based on the CSI-RS of the adjacent cell may be utilized in a multi-cell transmission technology, such as CoMP (cooperative multipoint).

(2) Reduces interference to CSI-RS transmission in another cell. In a network, such as a heterogeneous network, where cells overlap each other, energy may be removed from the position of a resource element where a CSI-RS is transmitted from the other cell, so that a signal from the other cell may be prevented from being interfered by a signal transmitted from the current cell.

As in case (1), upon receiving a CSI-RS of the adjacent cell, since a muted CSI-RS is used for the CSI-RS aggregation used in the adjacent cell, a muted CSI-RS constituted of a plurality of aggregations may be used. A muted CSI-RS including one aggregation may be used to avoid interference with a CSI-RS of a cell overlapping its own cell as in case (2).

Figure 4:
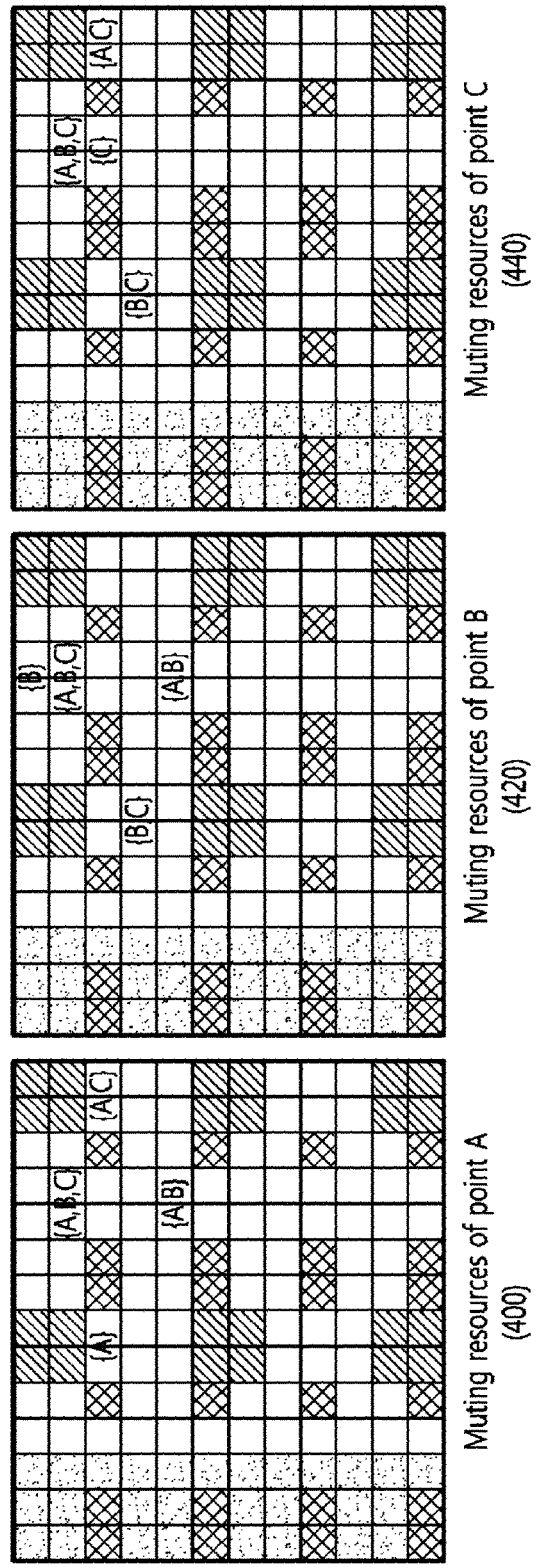
FIG. 4 is a conceptual view illustrating a plurality of structures where CSI-RSs are mapped in the resource block pair.

FIG. 4 is a conceptual view illustrating a plurality of structures where CSI-RSs are mapped in the resource block pair.

In the following embodiment, for ease of description, two CSI-RSs are assumed to be included in the resource block pair, but as described above, one, four, or eight CSI-RSs may be included in the resource block pair.

Referring to FIG. 4, to reduce inter-cell interference in a multi-cell environment, such as HetNet, a CSI-RS may have different configurations (or structures) in the resource block pair.

In the resource block pair, the CSI-RS configuration may vary depending on the number of antenna ports in the cell, and as different CSI-RS configuration as possible may be made between adjacent cells.

Further, in the resource block pair, the CSI-RS configurations may be divided depending on the type of CP (cyclic prefix), and may also be separated into a case of applying to both frame structure 1 and frame structure 2 and a case of applying only to frame structure 2 (frame structure 1 and frame structure 2 indicate whether the transmission scheme is TDD (time division duplex) or FDD (frequency division duplex).

Further, the CSI-RS supports up to 8 ports (p=15, p=15, 16, p=15, . . . , 18 and p=15, . . . , 22) contrary to the CRS and may be defined for Δf=15 kHz.

The CSI-RS configuration may be produced by the following method.

A sequence for the CSI-RS, $r_{l,n_s}(m)$, is generated by the following equation:

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \langle\text{Equation 1}\rangle$$

$$m = 0, 1, \ldots, N_{RB}^{max,DL} - 1$$

where, $$c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

In the above equation, $n_s$ refers to a slot number in one radio frame, and refers to an OFDM symbol number in the slot. c(i) refers to a pseudo random sequence, and starts from each OFDM symbol as $c_{init}$. $N_{ID}^{cell}$ refers to a physical layer cell ID.

The pseudo-random sequence, $r_{l,n_s}(m)$, generated in a seed value based on a cell ID may be subjected to resource mapping with a complex-valued modulation symbol $a_{k,l}^{(p)}$. The following Equation 2 refers to an equation in which in the subframes configured to transmit CSI-RSs, the reference signal sequence, $r_{l,n_s}(m)$, is mapped with complex-valued modulation symbol $a_{k,l}^{(p)}$, which is used a reference symbol for antenna port p.

$$a_{k,l}^{(p)} = w_{l''} \cdot r_{l,n_s}(m') \quad \text{(Equation 2)}$$

where $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} 1'' & CSI \text{ reference signal configurations } 0\text{-}19, \\ & \text{normal cyclic prefix} \\ 21'' & CSI \text{ reference signal configurations } 20\text{-}31, \\ & \text{normal cyclic prefix} \\ 1'' & CSI \text{ reference signal configurations } 0\text{-}27, \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 2, (k', l') and $n_s$ are given in Tables 1 and 2 which are to be described below. The CSI-RS may be transmitted through a downlink slot that satisfies the conditions given in Tables 1 and 2.

The following Table 1 represents the CSI-RS settings for a normal CP.

TABLE 1

| CSI reference signal config-uration | | Number of CSI reference signals configured | | | | |
|---|---|---|---|---|---|---|
| | | 1 or 2 | | 4 | | 8 |
| | | (k', l') | ns mod2 | (k', l') | ns mod2 | (k', l') | ns mod2 |
| frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| frame | 20 | (11, 1) | 1 | (11, 1) | 1 | (11, 1) | 1 |

TABLE 1-continued

| CSI reference signal config-uration | | Number of CSI reference signals configured | | | | |
|---|---|---|---|---|---|---|
| | | 1 or 2 | | 4 | | 8 |
| | | (k', l') | ns mod2 | (k', l') | ns mod2 | (k', l') | ns mod2 |
| structure type 2 only | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 2 represents CSI-RS settings for an expanded CP.

TABLE 2

| CSI reference signal config-uration | | Number of CSI reference signals configured | | | | |
|---|---|---|---|---|---|---|
| | | 1 or 2 | | 4 | | 8 |
| | | (k', l') | ns mod2 | (k', l') | ns mod2 | (k', l') | ns mod2 |
| frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| frame structure type 2 only | 16 | (11, 1) | 1 | (11, 1) | 1 | (11, 1) | 1 |
| | 18 | (10, 1) | 1 | (10, 1) | 1 | (10, 1) | 1 |
| | 19 | (9, 1) | 1 | (9, 1) | 1 | (9, 1) | 1 |
| | 20 | (5, 1) | 1 | (5, 1) | 1 | | |
| | 21 | (4, 1) | 1 | (4, 1) | 1 | | |
| | 22 | (3, 1) | 1 | (3, 1) | 1 | | |
| | 23 | (8, 1) | 1 | | | | |
| | 24 | (7, 1) | 1 | | | | |
| | 25 | (6, 1) | 1 | | | | |
| | 26 | (1, 1) | 1 | | | | |
| | 27 | (0, 1) | 1 | | | | |

A number of CSI-RS configurations may be used in one cell, wherein a power CSI-RS may use zero or one configuration, and a zero-power CSI-RS may use zero or several configurations.

In case of the zero-power CSI-RS, in Table 1, 16 configuration types of 4 ports may be represented in 16-bit bitmap, and various configurations may be made with each bit set as 1. The bitmap is indicated by ZeroPowerCSI-RS of an upper layer. However, an RE is excluded which is set as a non-zero power CSI-RS. The MSB (most significant bit) is a lowest CSI-RS configuration index and an ascending-order configuration index is represented in order of the bit.

In the following case, the terminal is assumed not to transmit a CSI-RS.

In a special subframe in FS type2.

In a subframe where CSI-RS collides with synchronization signals, PBCH, and SystemInformationBlockType1 messages.

In a subframe where a paging message is transmitted.

In set S, such as S={15}, S={15,16}m S={17,18}, S={19, 20} or S={21,22}, an RE (Resource Element) where a CSI-RS of one antenna port is transmitted is not used for transmission of a PDSCH or a CSI-RS of another antenna port.

The subframe configuration $I_{CSI-RS}$ of a CSI-RS is indicated by an upper layer, and as in Table 3, the subframe configuration of the CSI-RS and the subframe offset value are indicated.

TABLE 3

| CSI-RS SubframeConfig ICSI-RS | CSI-RS periodicity TCSI-RS(subframe) | CSI-RS Subframe offset ICSI-RS (subframe) |
| --- | --- | --- |
| 0-4 | 5 | ICSI-RS |
| 5-14 | 10 | ICSI-RS-5 |
| 15-34 | 20 | ICSI-RS-15 |
| 35-74 | 40 | ICSI-RS-35 |
| 75-154 | 80 | ICSI-RS-75 |

The following Table 4 represents CSI-RS configuration IE (Information element).

TABLE 4

```
--ASN1START
CSI-RS-Config-r10 ::=      SEQUENCE {
    csi-RS-r10             CHOICE {
        release                NULL,
        setup                  SEQUENCE {
            antennaPortsCount-r10      ENUMERATED {an1, an2, an4, an8},
            resourceConfig-r10         INTEGER (0..31),
            subframeConfig-r1          INTEGER (0..154),
            p-C-r10                    INTEGER (-8..15)
        }
    }
                                    OPTIONAL,      -- Need ON
    zeroTxPowerCSI-RS-r10  CHOICE {
        release                NULL,
        setup                  SEQUENCE {
            zeroTxPowerResourceConfigList-r10   BIT STRING (SIZE (16)),
            zeroTxPowerSubframeConfig-r10       INTEGER (0..154)
        }
    }
                                    OPTIONAL       -- Need ON
}
--ASN1STOP
```

The CSI-RS configuration IE (information element) is CSI-RS-Config-r10 information and may include information on antennaPortsCount, resourceConfig, subframeConfig, and p-C-r10 as parameters for configuring a CSI-RS which is a reference signal. Further, the CSI-RS configuration IE may include a plurality of parameters in zeroTxPower-RS-r10 as parameters for configuring muted CSI-RS (zero-power CSI-RS).

That is, the CSI-RS configuration IE (information element) may include information on the configuration of zero-power CSI-RS and CSI-RS.

The parameters included in the configuration IE may include information disclosed in Table 5 as follows.

TABLE 5

CSI-RS-Config field description
antennaPortsCount
Parameter represents the number of antenna ports used for transmission TABLE 5-continued of CSI reference signals where an1 corresponds to 1, an2 to 2 antenna ports etc. see TS 36.211[1, 6.10.5].
p-C
Parameter: Pc, see TS 36.213[2, 7.2.5]
resourceConfig
Parameter: CSI reference signal configuration, see TS 36.211 [1, table 6.10.5.2-1 and 6.10.5.2-2]
subframeConfig
Parameter: ICSI-RS, see TS 36.211[1, table 6.10.5.3-1]
zeroTxPowerResourceConfigList
Parameter: ZeroPowerCSI-RS, see TS 36.211[1, 6.10.5.2]
zeroTxPowerSubframeConfig
Parameter: ICSI-RS, see TS 36.211[1, table 6.10.5.3-1]

FIG. 5, including view (A) and view (B), is a conceptual view illustrating a data transmission method using CoMP (coordinated multipoint transmission).

The CoMP means a cooperative communication scheme between points. In a multi-cell multi-distributed node system, the CoMP may apply to reduce inter-cell interference, and in a single cell multi-distributed node system, intra-cell inter-point interference may be reduced. If using the CoMP, the terminal may be jointly supported by multiple nodes. In case the CoMP is used, each base station may support one or more terminals at the same time using the same radio frequency resource so as to enhance system performance.

Further, when using the CoMP, the base station may perform the space division multiple access (SDMA) scheme based on the state information on the channel between the base station and the terminal.

A primary purpose of CoMP is to enhance communication performance of terminals positioned at a cell boundary or at a node boundary. In LTE, CoMP schemes may be generally divided into the following two types depending on the data transmission scheme.

(1) Joint Processing (JP)

FIG. 5(A) illustrates joint processing (JP). Referring to FIG. 5(A), joint processing (JP) refers to a scheme of transmitting data for the terminal 50 with the data shared by one or more nodes 510 and 520.

Joint processing (JP) may be classified into three types depending on the transmission method: coherent Joint Transmission, Non-Coherent Joint Transmission and Dynamic Point (Cell) Selection. The coherent joint transmission refers to a method of simultaneously processing data received from the terminal 500 by using precoding between cells. The non-coherent joint transmission refers to a method of the terminal 500 receiving and processing an OFDM signal using soft-combining.

In DPS (dynamic point selection), among a plurality of cells, one cell (or node 510) is in charge of data transmission through the PDSCH (physical downlink shared channel) and another cell (or another node 520) may transmit data to the terminal using a method of removing interference through muting. In case of using DPS, transmitting/muting point (node) may change when in one subframe another subframe is transmitted or with respect to the resource block pair in one frame.

(2) Coordination Scheduling (CS)/Coordination Beamforming (CB)

FIG. 5(B) illustrates coordination scheduling (CS)/coordination beamforming (CB). Referring to FIG. 5(B), CS/CB refers to a method in which transmission to the terminal 550 may be done from only one node (serving point, 560), and another node 570 cooperates with the serving point in such a manner as reducing interference with respect to scheduling or transmission beams. Further, the CS/CB may use an SSPS (Semi-static point selection) scheme. The SSPS represents that a specific terminal 550 receives transmission from one point (or node or cell, 560) and the transmission point transmitting data to the terminal is changed only in a semi-static way.

Figure 6:
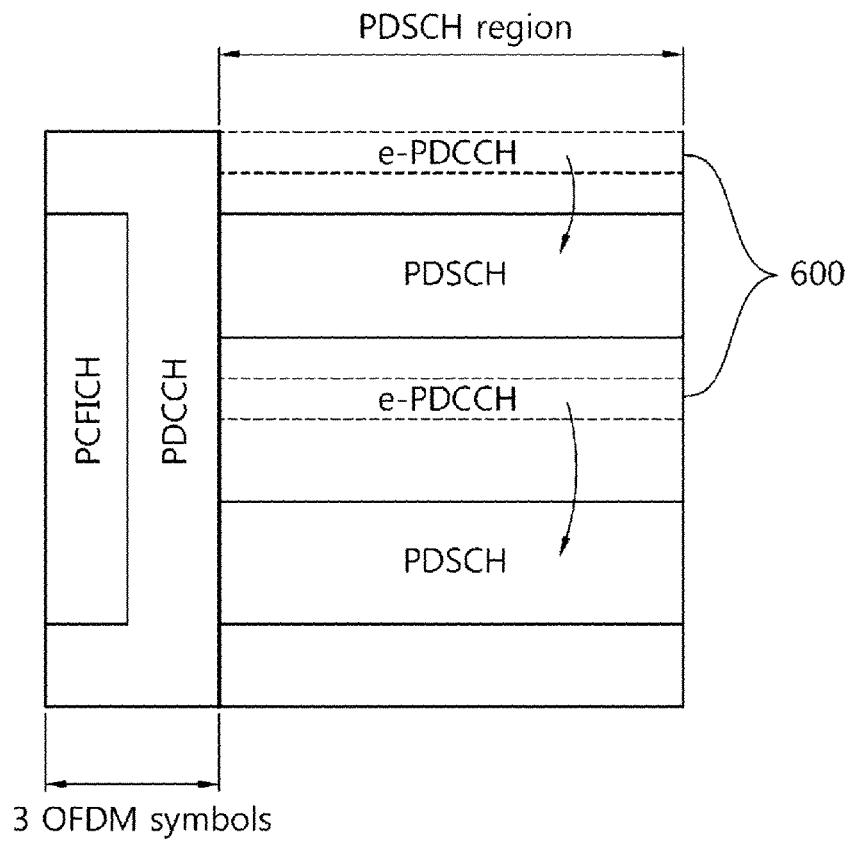
FIG. 6 is a conceptual view illustrating a newly introduced control channel, e-PDCCH (enhanced physical downlink control channel).

FIG. 6 is a conceptual view illustrating a newly introduced control channel, e-PDCCH (enhanced physical downlink control channel).

An introduction to a multi-distributed node system, such as RRH (radio remote head), enables application of various communication schemes, such as cooperation of each terminal/base station or cooperative scheme, so that link quality may be enhanced. Various communication schemes, such as MIMO (multiple-input multiple-output) and cooperative communication (for example, CoMP (Coordinated Multi-Point transmission/reception)), have limitations in applying through current control channels to a multi-distributed node environment including a plurality of nodes.

Accordingly, a need for introduction to a new control channel exists which may apply to the multi-distributed node environment. A new control channel defined according to such needs is e-PDCCH (RRH-PDCCH and x-PDCCH are collectively referred to as e-PDCCH). In the subframe, as a position where the e-PDCCH 600 is assigned, rather than the existing control region (hereinafter, referred to as "PDCCH region"), a data transmission region (hereinafter, referred to as "PDSCH (physical downlink shared channel)) may be used.

Control information for the node of the multi-distributed node system may be transmitted per terminal through e-PDCCH 600, and thus, any problem that arises due to lack of the control region may be addressed. The terminal should perform a blind decoding procedure to detect whether there is e-PDCCH 600. e-PDCCH 600 performs the same scheduling operation (PDSCH, PUSCH control) as the existing PDCCH, but as the number of terminals connected to the node (for example, RRH (remote radio head) increases, more e-PDCCHs 600 may be assigned in the PDSCH region, which leads to an increase in count of blind decoding which should be done by the terminal, so that complexity may be increased.

A specific method of assigning e-PDCCH 600 may be defined based on the structure of R-PDCCH which is a control region newly defined for existing transmission using a relay.

Figure 7:
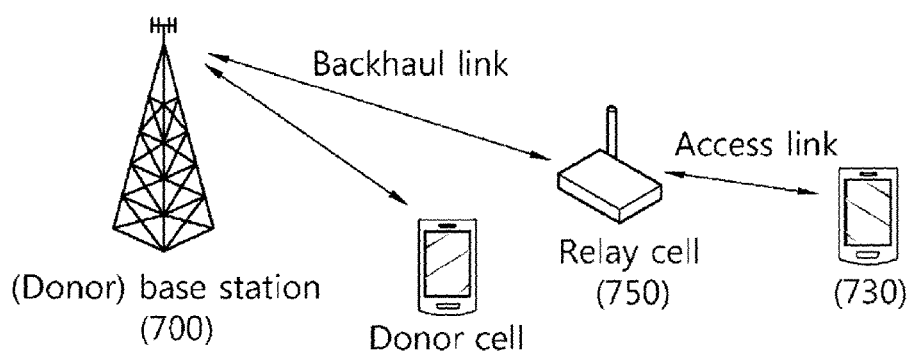
FIG. 7 is a conceptual view illustrating a relay scheme suggested in LTE.

FIG. 7 is a conceptual view illustrating a relay scheme suggested in LTE.

Referring to FIG. 7, an R-PDCCH (relay physical downlink control channel) may be newly defined and used for a decode-and-forward scheme using the relay 750.

A link between the relay 750 and the base station 700, i.e., backhaul link, and an access link between the relay 750 and the terminal 730 may be formed in the same frequency spectrum. In case the backhaul link and the access link are formed in the same frequency spectrum, when the relay 750 receives data from the base station 700 through the backhaul link, the operation in which the relay 750 transmits data to the terminal 730 through the access link may not occur at the same time. Accordingly, there is a need for a method of separating the two links from each other in operation so that transmission and reception are not simultaneously performed through the backhaul link and the access link.

When a frame is transmitted from the relay 750 to the terminal 730 through the access link to separate the backhaul link and the access link from each other in operation, a transmission gap is created between a subframe and another subframe, so that a frame may be transmitted from the base station 700 to the relay 750 through the backhaul link in the transmission gap.

In case of a frame transmitted from the base station 700 to the relay 750 through the transmission gap, since the transmission duration is shorter than the full subframe duration, L1/L2 control signal may not be transmitted from the base station 700 to the relay 750 using the general PDCCH. For such a reason, an R-PDCCH is newly defined and used, which is a relay-specific control channel, in the existing control channel.

Figure 8:
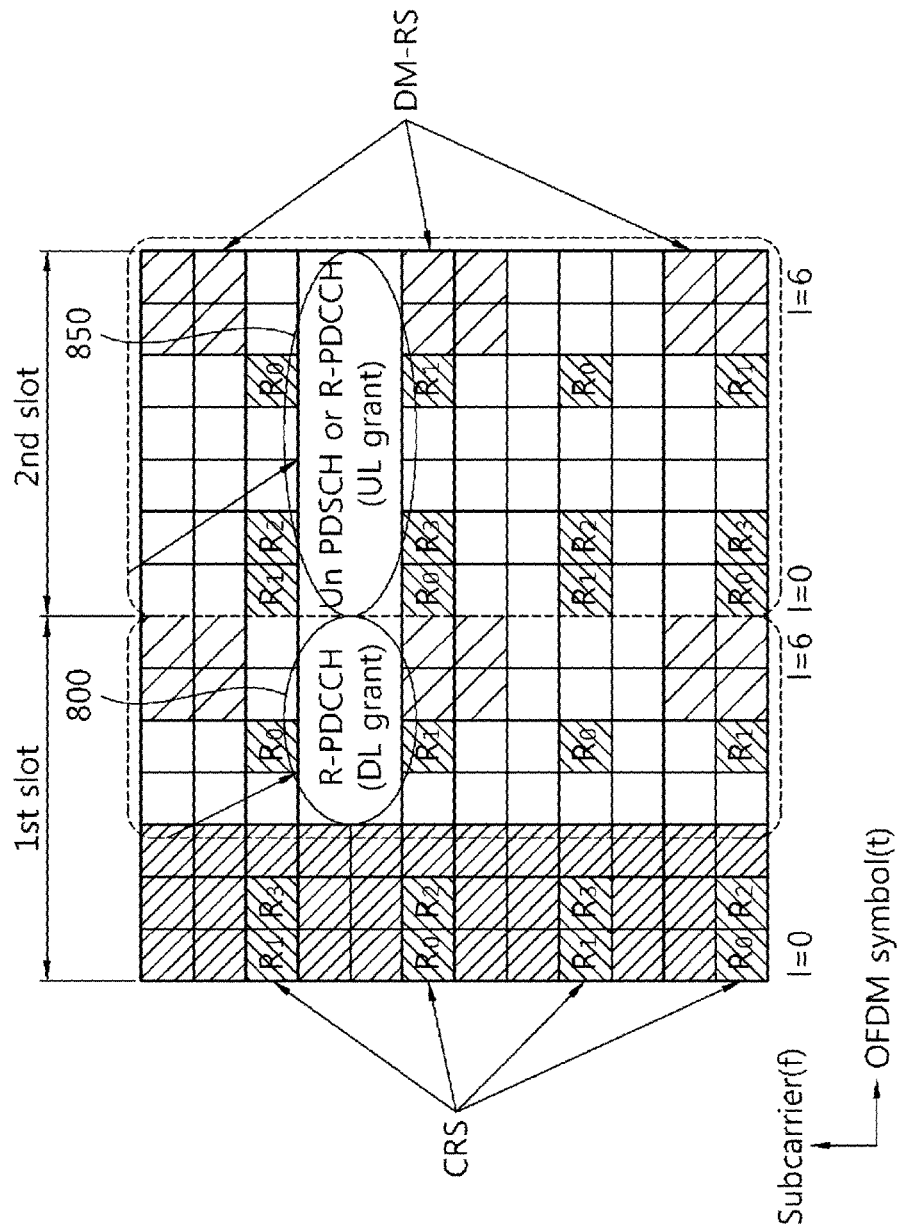
FIG. 8 is a conceptual view illustrating a structure of allocation of an R-PDCCH for a relay.

FIG. 8 is a conceptual view illustrating a structure of allocation of an R-PDCCH for a relay.

Referring to FIG. 8, R-PDCCH uses the same format as a DCI format used for PDCCH, and may transmit downlink scheduling assignment 800 and uplink scheduling grants 850. In general, as a method of splitting a frame into a control region and a data region, in light of latency, the control regions needs to be positioned at the foremost portion of the subframe as possible.

For the same reason, the downlink scheduling assignment 800 of the R-PDCCH may be first assigned to the first slot of the subframe. The uplink scheduling grant 850, which is relatively less critical in light of latency, may be assigned to the second slot of the subframe. Further, the R-PDCCH is configured so that a resource element used for R-PDCCH is spanned in a small range over the frequency axis and in a large range over the time axis in terms of overhead and scheduling flexibility.

When using such structure of R-PDCCH, the terminal may first decode the time-critical downlink scheduling assignment 800. If there is no uplink scheduling grant 850, the resource element where the uplink scheduling grant 850 may be used for transmitting the PDSCH.

The regions other than R-PDCCH, CRS (cell-specific reference signal), DMRS (demodulation reference signal) may be used to transmit PDSCH (physical downlink shared channel). The method of transmitting the PDSCH may be determined depending on a reference signal through which the transmission mode, DCI format, and R-PDCCH are demodulated.

The following Table 6 shows a method of transmitting PDSCH according to transmission mode, DCI format, and R-PDCCH.

TABLE 6

| Transmission mode | DCI format | Transmission scheme of PDSCH corresponding to R-PDCCH |
|---|---|---|
| Mode 8 | DCI format 1A | If the R-PDCCH is demodulated based on UE-specific reference signals: Single antenna port; port 7 and $n_{SCID} = 0$ is used. If the R-PDCCH is demodulated based on cell-specific reference signals: If the number of PBCH antenna ports is one: Single-antenna port, port 0 is used Otherwise Transmit diversity is used |
| | DCI format 2B | Dual layer transmission, port 7 and 8; or single-antenna port, port 7 or 8 |
| Mode 9 | DCI format 1A | If the R-PDCCH is demodulated based on UE-specific reference signals: Single antenna port; port 7 and $n_{SCID} = 0$ is used. If the R-PDCCH is demodulated based on cell-specific reference signals: If the number of PBCH antenna ports is one: Single-antenna port, port 0 is used Otherwise Transmit diversity is used |
| | DCI format 2C | Up to 4 layer transmission, ports 7-10 |

Referring to Table 6, the method of transmitting PDSCH may be determined depending on whether DM-RS or CRS is used for demodulation of transmission mode, DCI format, and R-PDCCH.

The transmission mode concerns which multi-antenna transmission scheme is to be used, and the transmission method according to each transmission mode may be as follows:

Transmission mode 1: Single-antenna transmission.
Transmission mode 2: Transmit diversity.
Transmission mode 3: Open-loop codebook-based precoding in the case of more than one layer, transmit diversity in the case of rank-one transmission.
Transmission mode 4: Closed-loop codebook-based precoding.
Transmission mode 5: Multi-user-MIMO version of transmission mode 4.
Transmission mode 6: Special case of closed-loop codebook-based precoding limited to single-layer transmission.
Transmission mode 7: Release-8 non-codebook-based precoding supporting only single-layer transmission.
Transmission mode 8: Release-9 non-codebook-based precoding supporting up to two layers.
Transmission mode 9: Release-10 non-codebook-based precoding supporting up to eight layers.

As a transmission mode to transmit R-PDCCH, transmission mode 8 and transmission mode 9 may be used.

DCI (downlink control information) may have a plurality of formats, and among the plurality of DCI formats, the DCI format used for transmission of PDSCH may have DCI format 1A and DCI format 2B in case of transmission mode 8, and may have DCI format 1A and DCI format 2C in case of transmission mode 9. The details on various DCI formats are specified in 3GPP TS 36.213 V10.3.0 "3rd Generation Partnership Project Technical Specification Group Radio Access Network; Evolved Universal Terrestrial Radio Access (E-UTRA); Physical layer procedures (Release 10)".

For example, in case transmission mode 8, DCI format is 1A, and the reference signal used for demodulating R-PDCCH is UE-specific reference signal (DM-RS), a single antenna (port 7) is used and 0 is used as scrambling ID (SCID) to transmit the PDSCH. In contrast, in case the reference signal used for demodulation of R-PDCCH is CRS, only when the number of PBCHs (physical broadcast channel) transmission antennas is 1, port 0 is used, and when the number of PBCH transmission antennas is 2 or 4, a shift to Tx diversity mode is made to use all of ports 0 to 1 and ports 0 to 3.

Figure 9:
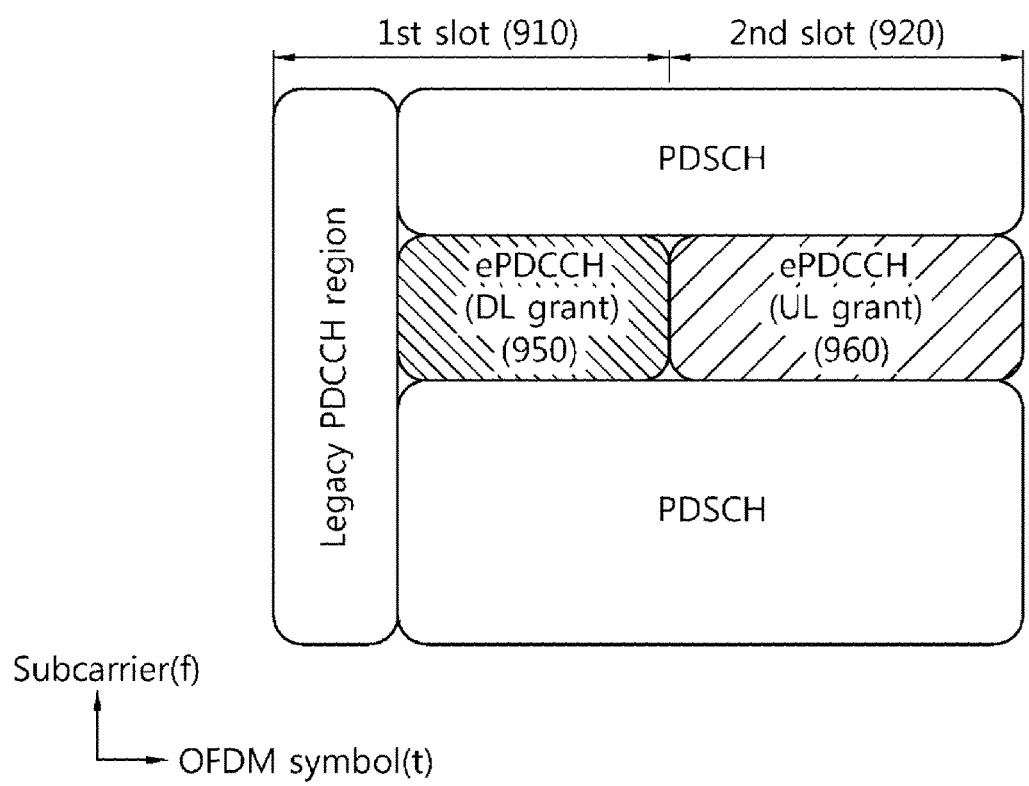
FIGS. 9 and 10 are conceptual views illustrating methods of assigning e-PDCCH in the subframe.
Figure 10:
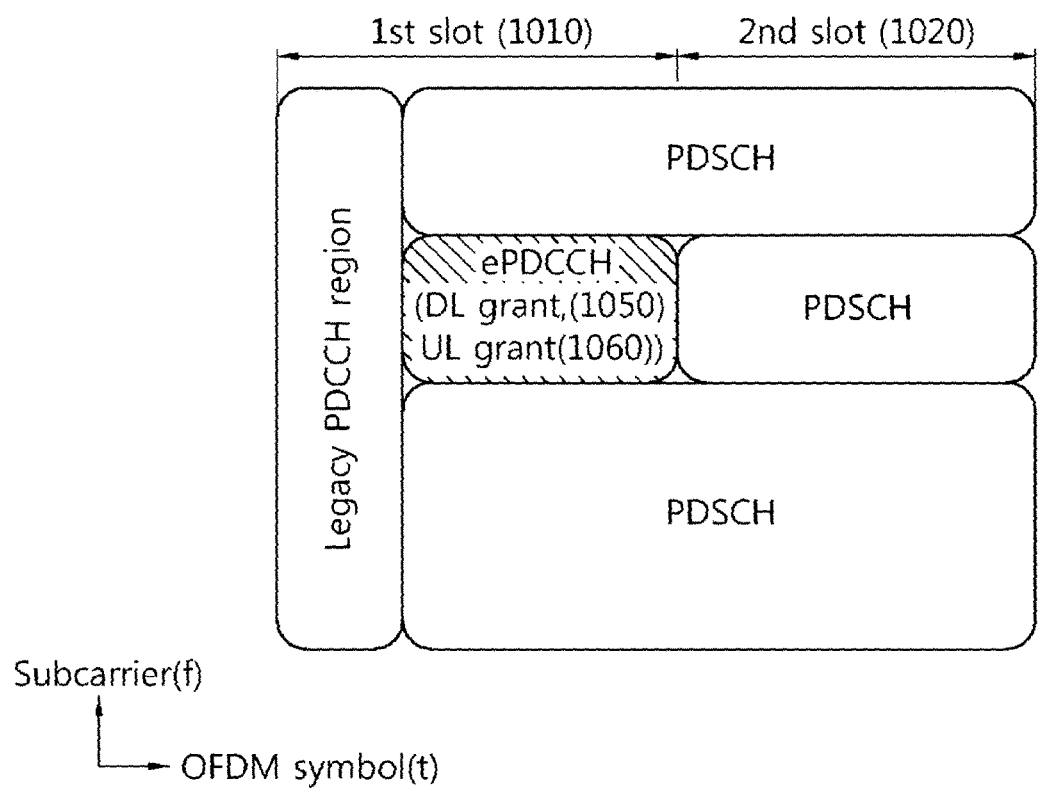

FIGS. 9 and 10 are conceptual views illustrating methods of assigning e-PDCCH in the subframe.

e-PDCCH may be a channel that transmits control information demodulated by DM (demodulation)-RS (reference signal) transmitted in the resource region where e-PDCCH is transmitted.

Referring to FIG. 9, e-PDCCH may be configured in both 1st slot 910 and 2nd slot 920, and DL grant (downlink scheduling assignment, 950) may be assigned to the first slot 910 and UL grant (uplink scheduling grant, 960) may be assigned to the second slot 920. Here, the DL grant 950 may mean DCI formats (e.g., DCI formats 1, 1A, 1B, 1C, 1D, 2, and 2A) for transmitting downlink control information of the terminal and the UL grant 960 may mean DCI formats (e.g., DCI formats 0 and 4) which are uplink control information of the terminal.

Since the DL grant 950 and the UL grant 960 are separately transmitted for each of the slots 910 and 920 in the subframe, the terminal may configure s search space in the first slot 910 in the subframe to perform blind decoding to find the DL grant 950 and may perform blind decoding to find the UL grant 960 in the search space configured in the second slot 920 in the subframe, thereby demodulating the DL grant 950 and the UL grant 960.

Referring to FIG. 10, assuming that e-PDCCH is configured only in the first slot 1010 in the subframe when assigning e-PDCCH, DL grant (downlink scheduling assignment, 1050) and UL grant (uplink scheduling grant, 1060) may be simultaneously assigned to the first slot 1010 in the subframe. Accordingly, the DL grant 1050 and the UL grant 1060 are simultaneously present in e-PDCCH of the first slot 1010, and the terminal may perform blind decoding to find the DL grant 1050 and the UL grant 1060 only in the first slot 1010 of the subframe.

In the general radio communication standards, the physical cell ID (PCI) that is information regarding which cell the current terminal is positioned may be transmitted to the terminal when the synchronization signal (SS) is transmitted from the base station to the terminal. The PCI transmitted to the terminal is specified to be used to receive various PHY channels or signals (e.g. PBCH, PDCCH, PCFICH, downlink RS(CRS, CSI-RS, DM-RS, PRS) in LTE-A) or to transmit the PHY channels or signals (e.g. PUCCH ㄴㅏ uplink RS(SRS, DM-RS) in LTE-A) (in IEEE802.16m, DRU permutation rule is determined by PCI).

Nested virtual cell system (NVCS) means a system that configures a cell ID (or virtual cell ID: VCI) associated with generation of some physical signals used for transmission/reception by some nodes in the cell in the single cell multi-distributed node system to be different from PCI (or PCI used in primary & secondary SS) commonly used by all the nodes in the cell.

Hereinafter, in some embodiments of the present invention, a cell ID associated with generation of some physical signals used for transmission/reception by some nodes in the cell in the single cell multi-distributed node system is defined as a virtual cell ID.

Figure 11:
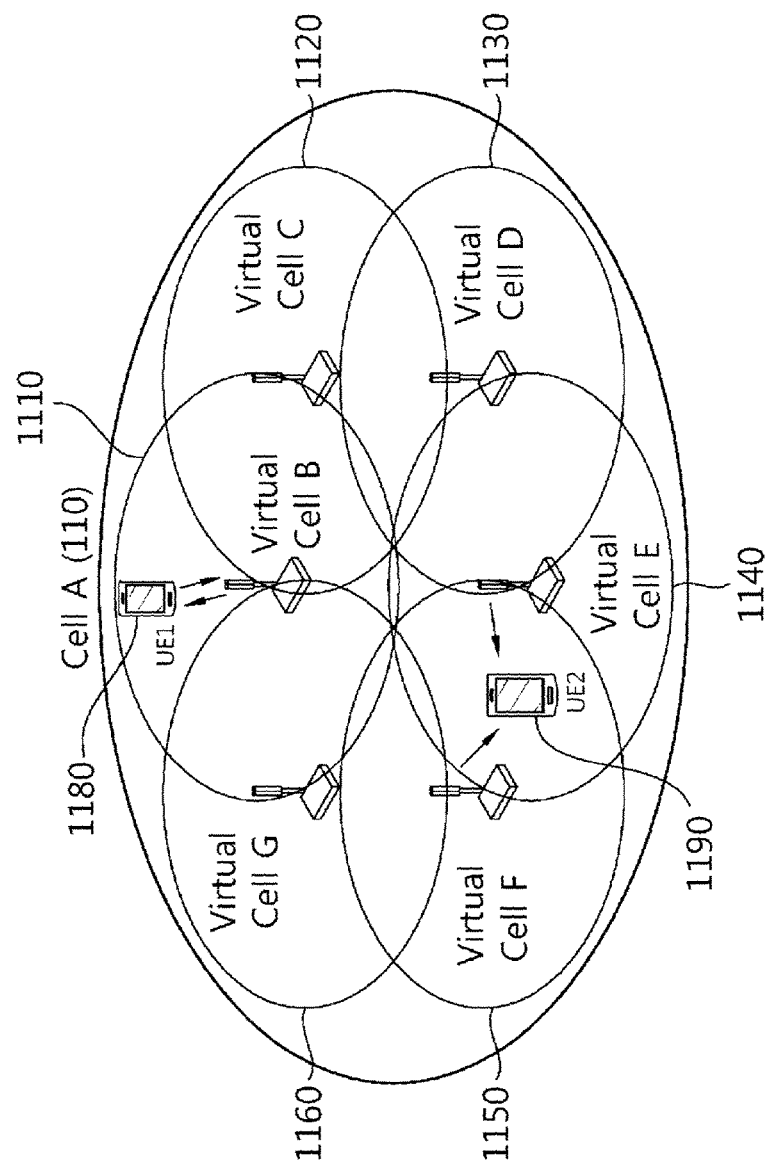
FIG. 11 is a conceptual view illustrating the nested virtual cell system.

FIG. 11 is a conceptual view illustrating the nested virtual cell system.

Referring to FIG. 11, all of the six nodes 1110, 1120, 1130, 1140, 1150, and 1160 are positioned in cell A 1100. Each node uses the primary SS (synchronization signal) and secondary SS generated with common PCI 'A' which is the physical cell ID (PCI) of cell A 1100. Accordingly, when the terminal enters the nested virtual cell system, the terminals 1180 and 1190 recognize that they are currently in the cell A 1100 irrespective of the relative position between the terminal and the node. In such case, the terminals 1180 and 1190 cannot perform the operation, such as cell selection/re-selection or handover, which is the operation defined among the existing nodes between nodes belonging to cell A 1100.

However, in the multi-distributed node system, the operation defined between cells needs to be newly defined and used between the nodes included in one cell. Accordingly, the six nodes 1110, 1120, 1130, 1140, 1150, and 1160 included in the same cell A 1100 may use different virtual cell IDs so that the operation performed between cells may be also done between the nodes 1110, 1120, 1130, 1140, 1150, and 1160.

As shown in FIG. 11, six nodes node B to node G 1110, 1120, 1130, 1140, 1150, and 1160 may be included in cell A 1100, and each node may use a virtual cell ID to generate some physical signals (e.g., CSI-RS) and may transmit the generated physical signals to the terminals 1180 and 1190. For example, in case a virtual cell ID is used to indicate a node associated with generation of the CSI-RS, the base station sends a request for CSI (channel state information) feedback for a specific node to the terminal 1180 while informing the virtual channel ID used by the corresponding node to the terminal. In case the base station intends to be aware of the channel state between the terminal and node 'B' 1110, the base station may send a request for CSI (channel state information) feedback for the node 1110 having virtual cell ID 'B' to the terminal 1180.

Likewise, when sending a request for CSI feedback for the nodes 1140 and 1150 that are to attend CoMP to the terminal 1190 so as to perform CoMP transmission to the terminal 1190, virtual cell IDs E and F for the nodes to attend CoMP (CoMP measurement set or CoMP reporting set, 1140, 1150 may be specified and notified to the terminal 1190.

For example, in case the node 1140 and the node 1150 perform CoMP on the terminal 1190, the base station may transmit indication information on the nodes performing CoMP, i.e., virtual cell ID 'E' and virtual cell ID 'F', to the terminal 1190. Various node-based operations as well as transmission using CoMP may be performed based on the virtual cell ID of each node.

For example, when the base station transmits a specific signal separated for each node 1110, 1120, 1130, 1140, 1150, and 1160 to the terminal and is fed back with a measurement value in response in order to figure out which node 1110, 1120, 1130, 1140, 1150, and 1160 the terminals 1180 and 1190 are around, the virtual cell Id used for each node 1110, 1120, 1130, 1140, 1150, and 1160 needs to be notified to the terminals 1180 and 1190.

That is, the operation between each node and the terminal may be defined based on the virtual cell ID defined based on the node in the multi-distributed node system. In an embodiment of the present invention, the operation between the terminal and the node based on the virtual cell ID as follows is disclosed.

(1) Method of transmitting node information used for generating CSI-RS in the multi-distributed node system by adding virtual cell ID information to CSI-RS information element.

(2) Method of transmitting e-PDCCH setting information through an RRC message from a base station to a terminal in the multi-distributed node system, with PPCI (primary physical cell ID) included in the setting information.

(3) Method of implicitly or explicitly transmitting a primary physical cell ID through a configuration information element of CSI-RS transmitted from a node to a terminal in the multi-distributed node system.

(4) Method of performing e-PDCCH demodulation, PDSCH demodulation, UE-specific RS demodulation, serving point indication for CoMP based on virtual cell ID information of the primary CSI-RS configured by a base station in the multi-distributed node system and transmitted through a node.

Hereinafter, in an embodiment of the present invention, for ease of description, a multi-distributed node system is assumed. However, the embodiment of the present invention may also apply to when a terminal receives data from a plurality of nodes or a plurality of base stations, like the CoMP of the multi-cell system, and such embodiment is also within the scope of the present invention.

Hereinafter, the embodiment of the present invention discloses a method of using an RRC message, such as PhysicalConfigDedicated IE and CSI-RS configuration or e-PDCCH setting information, so that a base station transmits virtual cell ID of a node, primary physical cell ID, and primary CSI-RS to the terminal. However, other transmission formats than the RRC message may be used for the base station to transmit the virtual cell ID of the node, primary physical cell ID, and primary CSI-RS to the terminal, and such embodiment is also included in the scope of the present invention.

Figure 12:
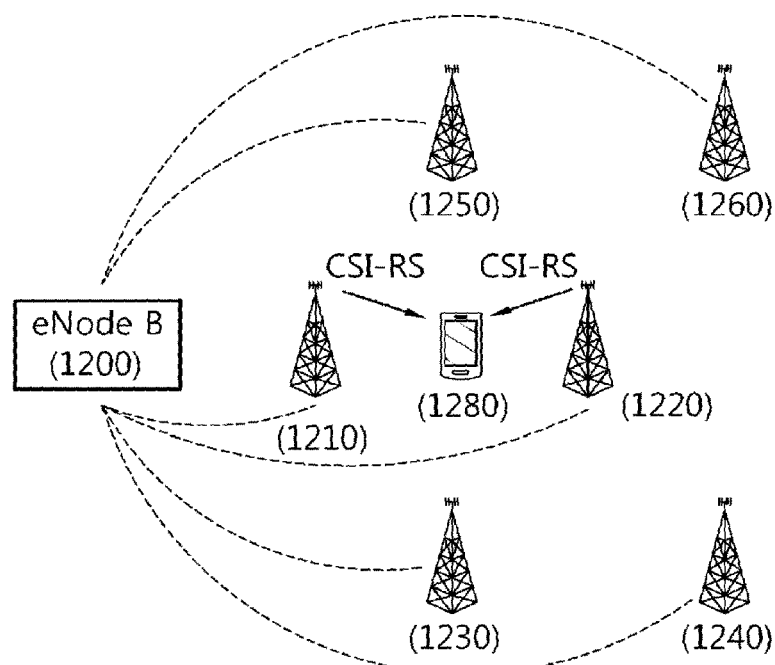
FIG. 12 is a conceptual view illustrating a method of transmitting a virtual cell ID through a CSI-RS information element according to an embodiment of the present invention.

FIG. 12 is a conceptual view illustrating a method of transmitting a virtual cell ID through a CSI-RS information element according to an embodiment of the present invention.

Referring to FIG. 12, in the multi-distributed node system, a plurality of nodes 1210, 1220, 1230, 1240, 1250, and 1260 may be present in one base station 1200. The terminal 1280 may receive a CSI-RS from at least one node present in the multi-distributed node system.

For example, the terminal 1280 may receive a CSI-RS from at least one node among nodes 1210 and 1220. The terminal may recognize one of the nodes 1210 and 1220 from which the received CSI-RS has been transmitted based on the virtual cell ID information included in the received CSI-RS configuration information element (CSI information element, CSI-RS IE or CSI-RS configuration information also have the same meaning).

The following Table 7 shows CSI-RS configuration information elements that include virtual cell ID information.

TABLE 7

```
CSI-RS-Config IE
{
    csi-RS // (OPTIONAL)
    {
        Antenna port            : select one of 1, 2, 4, and 8,
        resource configuration  : select one of integers 0~31
        subframe configuration  : select one of integers 0~154,
        Power control           : select one of integers -8 ~
                                                       15
        Cell ID                 : select one of integers 0~503
        (optional: omitted in such case as PCI through SS)
    }
    zeroTxPowerCSI-RS //(OPTIONAL)
    {
        zeroTxPowerResourceConfigList  : 16 bit bitmap,
        zeroTxPowerSubframeConfig      : select one of integers
                                                       0~154
    }
}
```

Referring to Table 7, the cell ID field including virtual cell ID information may be added to CSI-RS configuration information element (or CSI information element, CSI IE). The terminal 1280 may be aware of one of the nodes 1210 and 1220 from which the received CSI-RS is transmitted based on the cell ID field. For example, based on the cell ID field of the CSI-RS information element, the terminal 1280 may be aware that the received CSI-RS has been transmitted from the node 1220. In such case, the terminal 1280 may feed channel information between the terminal 1280 and the node 1220 back to the node 1220 based on the virtual cell ID information. As another example, the terminal may obtain channel information per node based on the virtual cell ID information transmitted from nodes upon performing CoMP.

The cell ID field shown in Table 7 is an example of a field for transmitting the virtual cell ID of the node and may be defined in other ways. For example, it may be replaced by PhysCellId IE, which is defined "3GPP TS 36.331 V10.2.0: "Evolved Universal Terrestrial Radio Access (E-UTRA); Radio Resource Control (RRC); Protocol specification (Release 10)" or a new cell id IE may be defined (e.g., virtual cell id).

In case the virtual cell ID transmitted through the cell ID is the same as physical cell ID (PCI) sent through the synchronization signal (SS), the virtual cell ID information transmitted through the cell ID field may not be transmitted. In such case, the operation based on the above-described virtual cell ID may be performed using the existing PCI value.

Figure 13:
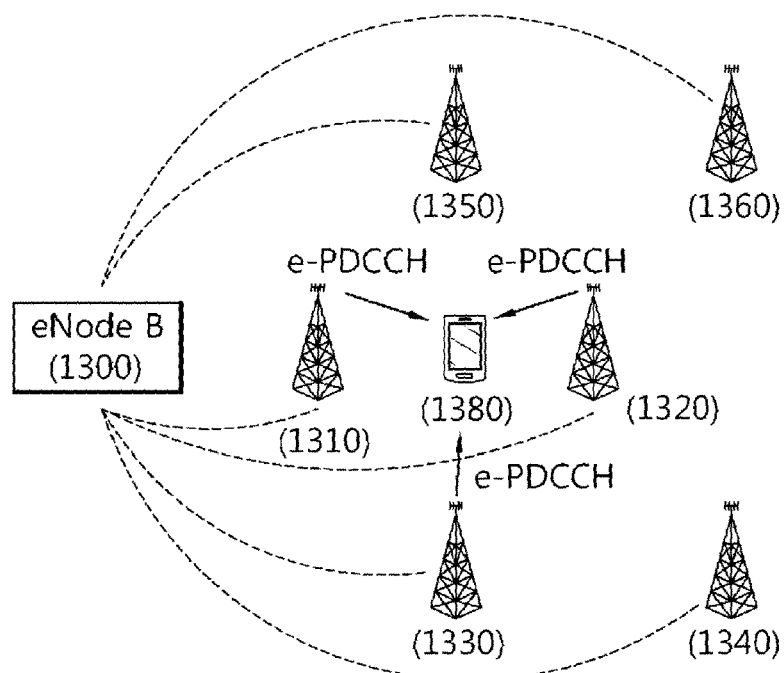
FIG. 13 is a conceptual view illustrating a method of transmitting virtual cell ID information that transmits e-PDCCH according to an embodiment of the present invention.

FIG. 13 is a conceptual view illustrating a method of transmitting virtual cell ID information that transmits e-PDCCH according to an embodiment of the present invention.

In a single cell multi-distributed node system, due to lack of control channel, introduction to e-PDCCH is considered. e-PDCCH may include terminal specific control information, and unlike the existing PDCCH, the control information transmitted through e-PDCCH may be used as a reference signal for demodulating UE-specific RS (or DM (demodulation)-RS) instead of cell-specific RS.

In a single cell multi-distributed node system, each node may transmit control information to different terminals through e-PDCCH. That is, in case the multi-distributed node system operates as an NVCS (nested virtual cell system), the operation of a plurality of nodes 1310, 1320, 1330, 1340, 1350, and 1360 in a cell may be discerned based on virtual cell ID. Each node may transmit individual control information to the terminal 1380 through e-PDCCH based on the virtual cell ID.

The base station 1300 may transmit PPCI (primary physical cell ID) to the terminal 1380 using a transmission format, such as an RRC message. PPCI (primary physical cell ID) is information indicating a node that transmits data which is supposed to be received by the terminal 1380 and may be used to discern a node that transmits control information supposed to be received by the terminal through e-PDCCH.

The terminal 1380 may be aware of a node from which to receive control information based on the PPCI. Hereinafter, according to an embodiment of the present invention, a method of a terminal receiving control information transmitted from a specific node through e-PDCCH based on the configuration information of the e-PDCCH transmitted from the base station 1300 is described.

To transmit a primary physical cell ID, the base station 1300 may use, for example, RRC message. Hereinafter, according to an embodiment of the present invention, as the RRC message, CSI-RS configuration element or e-PDCCH configuration information, PhysicalConfigDedicated IE are used, but are not limited thereto, and other RRC messages may be also used. Further, the RRC message used to transmit the primary physical cell ID is an example, and the primary physical cell ID may be transmitted by other transmission methods.

Referring to FIG. 13, in a multi-distributed node system, a plurality of nodes 1310, 1320, 1330, 1340, 1350, and 1360 may be present in one base station 1300. The terminal 1380 may receive control information through e-PDCCH from at least one node present in the multi-distributed node system.

To determine a node from which the control information received through at least one e-PDCCH is transmitted, the terminal 1380 may use PPCI. The terminal may receive control information through e-PDCCH transmitted from a node corresponding to PPCI.

The base station 1300 may transmit PPCI (primary physical cell ID) to the terminal 1380 using the following methods:

1) method of transmitting PPCI from the base station 1300 to the terminal 1380, with a predetermined message (e.g., RRC message) for configuring e-PDCCH included in the PPCI.

2) method of explicitly or implicitly indicating PPCI to the terminal through CSI-RS transmitted from the node.

Firstly, the method of transmitting PPCI from the base station 1300 to the terminal 1380, with a predetermined message (e.g., RRC message) for configuring e-PDCCH included in the PPCI is described. Control information may be transmitted through e-PDCCH from a plurality of nodes 1310, 1320, and 1330 having different virtual cell IDs to the terminal 1380. In such case, the terminal 1380 may determine a node from which the control information received through e-PDCCH has been transmitted based on PPCI. The terminal 1380 may receive control information transmitted from a node having the same virtual cell ID as PPCI (primary physical cell ID).

Such PPCI may be transmitted from the base station 1300 to the terminal 1380. For example, the base station 1300 may transmit PPCI to the terminal 1380 using an RRC message used to transmit e-PDCCH configuration information, such as whether e-PDCCH is subjected to interleaving, search space position information, or search space size information.

That is, the configuration information of e-PDCCH may be transmitted to the terminal, with the PPCI field, which is node information, included in the configuration information of e-PDCCH.

Next, the method of explicitly or implicitly indicating PPCI to the terminal through CSI-RS transmitted from the node may be used, and the following two methods may be adopted. The CSI-RS used to indicate PPCI may be referred to as primary CSI-RS.

- Method of adding a new field (e.g., indication of primary PCI) to CSI-RS configuration information element to explicitly indicate to the terminal CSI-RS having the same virtual cell ID as PPCI.
- Method of the terminal implicitly estimating the virtual cell ID of the CSI-RS with PPCI based on the CSI-RS positioned at a specific position among a plurality of CSI-RSs received to the terminal.

The method of adding a new field (e.g., indication of primary PCI) to CSI-RS configuration information element to explicitly indicate to the terminal CSI-RS having the same virtual cell ID as PPCI may be transmitted to RRC message through CSI-RS configuration information element as in, e.g., Table 8 below.

The following Table 8 shows a method of transmitting PPCI to a plurality of terminals through CSI-RS configuration IE.

TABLE 8

CSI-RS-Config IE
{
  for (allocation of multiple csi-RS patterns) {
    csi-RS // (OPTIONAL)
    {
      Antenna port              : select one of 1, 2, 4, and 8,
      resource configuration    : select one of integers 0~31,
      subframe configuration    : select one of integers 0~154,
      Power control             :select one of integers −8 ~ 15
      Cell ID                   : select one of integers 0~503
(optional: omitted in such case as PCI through SS)
      Indication of primary PCI: On/Off (Optional: only when the cell ID is PPCI, this field is ON. If the cell ID field is present only for one CSI-RS resource, this field may be not removed)
    }
  }
}

Referring to Table 8, the base station 1300 may transmit information on a plurality of CSI-RS patterns to the terminal 1380 through CSI-RS configuration IE. The CSI-RS patterns may be used to distinguish CSI-RSs transmitted through different virtual cell IDs from each other, and CSI-RS configuration information element may be set for each CSI-RS pattern.

For example, in case CSI-RSs are transmitted from nodes 1310 and 1320, respectively, information on each node that has transmitted the CSI-RS may be indicated based on the cell ID field of the transmitted CSI-RS configuration information element. Further, it may be known through the indication of primary PCI which node corresponds to the primary physical cell ID. For example, in case CSI-RS configuration information element is received from each of nodes 1310 and 1320 and the indication of primary PCI field of the CSI-RS configuration information element transmitted from node 1310 is on, the PPCI of the terminal 1380 may be the node 1310, and the terminal 1380 may receive control information through e-PDCCH transmitted from the node 1310.

As another example, in case the nodes 1310 and 1320 perform transmission using CoMP, a plurality of CSI-RSs having different virtual cell IDs, as reference signals used by different nodes, may be transmitted over one subframe. In such case, a plurality of CSI-RS patterns may be configured through CSI-RS configuration information of the RRC message.

The terminal 1380 may be aware of the virtual cell ID information of the plurality of CSI-RSs received based on the CSI-RS configuration information. That is, it may catch the virtual cell ID information of the received CSI-RS based on the cell ID field included in the CSI-RS configuration IE of Table 2. Further, it may be provided to the terminal 1380 the virtual cell ID of which CSI-RS is the same as the primary physical cell ID based on the indication of primary PCI included in the CSI-RS configuration information.

The terminal 1380 may perform one of the following operations to determine PPCI for receiving e-PDCCH based on the received CSI-RS configuration information element.

(1) In case a plurality of cell ID fields are present in the CSI-RS configuration information element, e-PDCCH may be received from a node having the virtual cell ID value indicated as PPCI by the indication of primary PCI.

(2) In case only one cell ID field is present in the CSI-RS configuration information element, e-PDCCH may be received from a node having the corresponding virtual cell ID. In such case, an indication of primary PCI field is not required to be provided, which indicates which cell ID is PPCI.

(3) If no cell ID field is present in the CSI-RS configuration information element, e-PDCCH may be received based on the physical cell ID (PCI) obtained through SS.

For example, in case the terminal 1380 receives a plurality of CSI-RSs having different virtual cell IDs, the terminal may determine which virtual cell ID is the primary physical cell ID based on the indication of primary PCI of the configuration information element of CSI-RS which is the RRC message. The terminal 1380 may receive control information through e-PDCCH transmitted from a node having the virtual cell ID corresponding to the primary physical cell ID produced by configuration information element of CSI-RS.

According to another embodiment of the present invention, without explicitly transmitting information on the virtual cell ID through the field (indication of primary PCI) newly defined in the RRC message as in Table 2, the terminal may implicitly estimate the information on the virtual cell ID.

Figure 14:
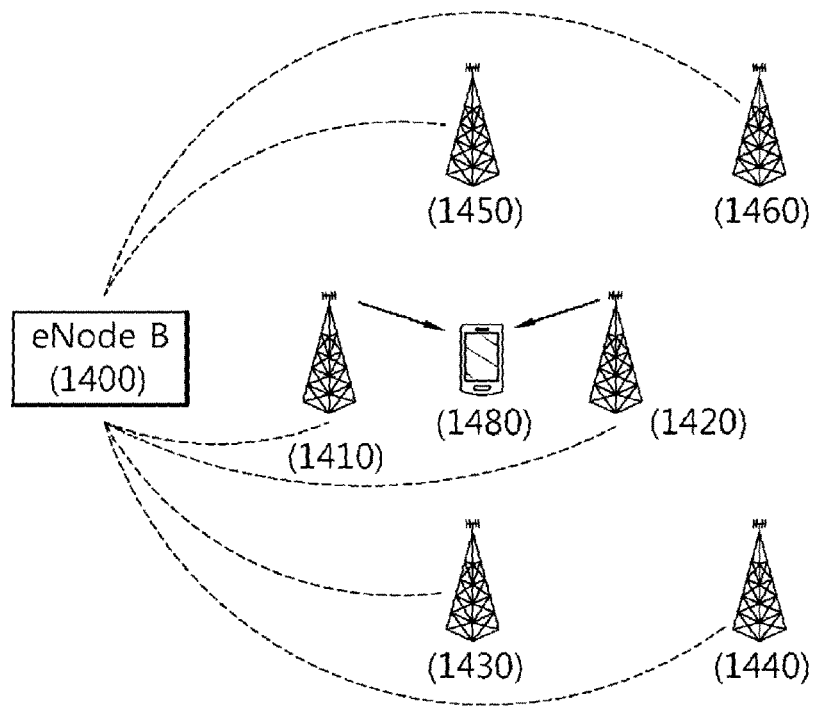
FIG. 14 is a conceptual view illustrating a method of allowing a terminal to implicitly estimate information on a virtual cell ID according to an embodiment of the present invention.

FIG. 14 is a conceptual view illustrating a method of allowing a terminal to implicitly estimate information on a virtual cell ID according to an embodiment of the present invention.

Referring to FIG. 14, the terminal 1480 may receive a plurality of CSI-RSs having different virtual cell IDs.

For example, the terminal 1480 may receive a subframe including a first CSI-RS pattern transmitted from a first node 1410 and a second CSI-RS pattern transmitted from a second node 1420. The CSI-RS pattern means aggregation of CSI-RSs having specific virtual cell IDs.

The terminal 1480 needs to determine which one of the first and second nodes 1410 and 1430 corresponds to PPCI. According to an embodiment of the present invention, among the CSI-RSs received by the terminal 1480, the virtual cell ID of a CSI-RS transmitted in a specific turn or a CSI-RS positioned at a specific location may be determined as the primary physical cell ID.

For example, the CSI-RS received by the terminal 1480 may be specified as a CSI-RS that is transmitted at a specific time and position in the subframe based on parameters, such as configuration number and subframe configuration number. The virtual cell ID of the specified CSI-RS may be the primary physical cell ID and the node that has transmitted the corresponding CSI-RS may be the PPCI. That is, the terminal 1480 may implicitly determine the virtual cell ID of the CSI-RS transmitted in a specific turn or present at a specific position as the PPCI (primary physical cell ID) and may receive control information transmitted from a node having the same virtual cell ID through e-PDCCH.

By using such method, even without transmitting a field, such as indication of primary PCI field, for determining whether the virtual cell ID that has transmitted the CSI-RS is PPCI, the primary virtual cell ID may be implicitly estimated that transmits control information through e-PD-CCH based on a specific non-zero-power CSI-RS resource element(s). At this time, the terminal may perform the following operations:

(1) In case a plurality of non-zero-power CSI-RS resources are present in the CSI-RS configuration, the terminal may receive control information transmitted through e-PDCCH from a node corresponding to primary physical cell ID by determining that the virtual cell ID of a specific CSI-RS resource is the primary physical cell ID.

(2) In case the cell ID field is absent from a specific CSI-RS, the terminal may receive control information through e-PDCCH based on the physical cell ID obtained through SS.

(3) In case only one non-zero-power CSI-RS resource is present in the CSI-RS configuration, the terminal may receive control information transmitted through e-PDCCH based on the virtual cell ID produced based on the received one non-zero-power CSI-RS. If the cell ID field of the received non-zero-power CSI-RS is omitted, e-PDCCH may be received based on the physical cell ID obtained through SS.

According to an embodiment of the present invention, upon configuring CSI-RS to be transmitted from a base station to a terminal, primary CSI-RS resource for producing PPCI (primary physical cell ID) may be indicated.

Figure 15:
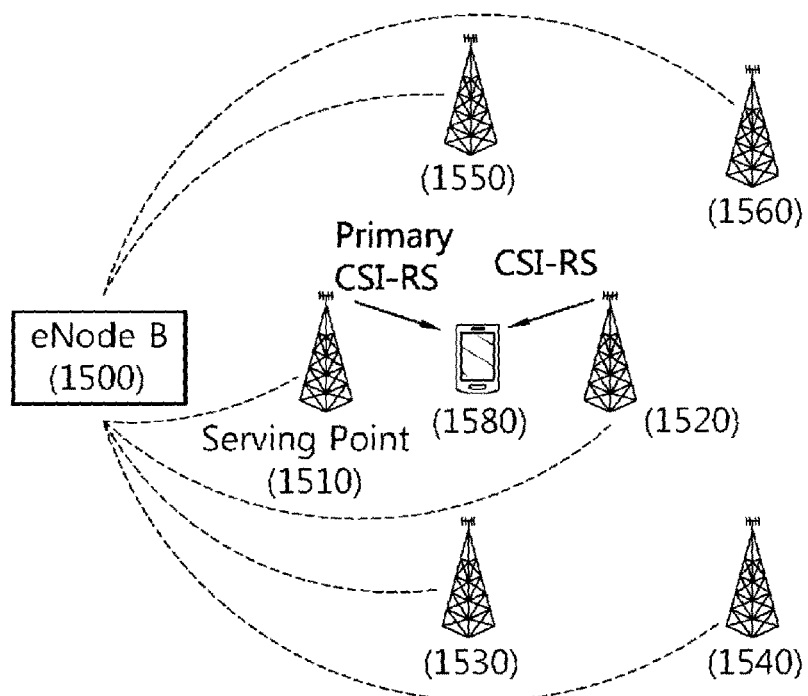
FIG. 15 is a conceptual view illustrating a method of controlling the operation of a node using PPCI according to an embodiment of the present invention.

FIG. 15 is a conceptual view illustrating a method of controlling the operation of a node using PPCI according to an embodiment of the present invention.

The primary PCI (PPCI) may be used for other purposes as well as for demodulation of e-PDCCH.

For example, it may be assumed as in Table 8 that a terminal receives a plurality of CSI-RS patterns having different virtual cell IDs. When configuring the CSI-RS to be transmitted to the terminal 1580, the base station 150 may indicate a primary CSI-RS to produce the PPCI.

The terminal 1580 may obtain various types of information based on the primary PCI indicated by the base station 1500. For example, 1) Primary CSI-RS may be used for indicating a serving point in the CoMP operation. For example, the terminal 1580 may be provided with information stating that the node 1510 having the virtual cell ID indicated by the cell ID of the primary CSI-RS upon performing the CoMP operation is the serving point based on the primary CSI-RS. It may distinguish the serving point from the remaining coordinating point(s) based on the virtual cell ID information indicated by the cell ID of the primary CSI-RS in the CoMP feedback. For example, to support the CS/CB (coordinated scheduling/beamforming) operation, it needs to be discerned which node is a node (serving point, 1510) which transmits data and which node is a node (coordinating points, 1520) to reduce damage from interference. At this time, the terminal 1580 may configure feedback assuming that the CSI-RS resource indicated as PPCI is CSI-RS transmission from the serving point 1510.

2) PPCI may be used for PDSCH demodulation of the terminal. The base station 1500 generates PDSCH with PPCI (used for generating sequence) and transmits it to the terminal 1580 irrespective of whether the node actually transmits data. The terminal 1580 may perform PDSCH demodulation when PPCI used for generating PDSCH is same as terminal's PPCI. The terminal 1580 may also perform UE-specific RS demodulation based on PPCI. The base station 1500 generates UE-specific RS with PPCI and transmits it to the terminal 1580 irrespective of whether the node actually transmits data. The terminal 1580 may perform UE-specific RS demodulation when PPCI used for generating UE-specific RS is same as terminal's PPCI.

Specific parameters (e.g., cell ID field) for the primary CSI-RS may apply not only to CSI-RS-configuration information element but also to other information elements, and thus may be defined in the message format higher than the CSI-RS-configuration information element and may be then transmitted.

The following Table 9 shows that a primary cell ID field is added to PhysicalConfigDedicated IE which is an IE (information element) to perform UE specific physical channel configuration.

TABLE 9

```
PhysicalConfigDedicated ::=         SEQUENCE {
Primary cell ID                     INTEGER(0..503)                      OPTIONAL
pdsch-ConfigDedicated               PDSCH-ConfigDedicated                OPTIONAL,-- Need ON
pucch-ConfigDedicated               PUCCH-ConfigDedicated                OPTIONAL,-- Need ON
pusch-ConfigDedicated               PUSCH-ConfigDedicated                OPTIONAL,-- Need ON
uplinkPowerControlDedicated  UplinkPowerControlDedicated                 OPTIONAL,
    -- Need ON
tpc-PDCCH-ConfigPUCCH   TPC-PDCCH-Config                                 OPTIONAL,-- Need ON
tpc-PDCCH-ConfigPUSCH   TPC-PDCCH-Config                                 OPTIONAL,-- Need ON
cqi-ReportConfig                    CQI-ReportConfig                     OPTIONAL,--Cond CQI-r8
soundingRS-UL-ConfigDedicated   SoundingRS-UL-ConfigDedicated
        OPTIONAL,          -- Need ON
        antennaInfo                 CHOICE {
            explicitValue                   AntennaInfoDedicated,
            defaultValue                    NULL
        }       OPTIONAL,                                                -- Cond AI-r8
schedulingRequestConfig     SchedulingRequestConfig                      OPTIONAL, -- Need ON
    ...,
[[cqi-ReportConfig-v920      CQI-ReportConfig-v920                       OPTIONAL,--Cond CQI-r8
antennaInfo-v920    AntennaInfoDedicated-v920                            OPTIONAL-- Cond AI-r8
```

TABLE 9-continued

```
]],
[[   antennaInfo-r10            CHOICE {
          explicitValue-r10            AntennaInfoDedicated-r10,
          defaultValue                 NULL
     }   OPTIONAL,                                      -- Cond AI-r10
antennaInfoUL-r10          AntennaInfoUL-r10           OPTIONAL,-- Need ON
cif-Presence-r10           BOOLEAN                     OPTIONAL,-- Need ON
cqi-ReportConfig-r10       CQI-ReportConfig-r10        OPTIONAL,-- Cond CQI-r10
csi-RS-Config-r10          CSI-RS-Config-r10           OPTIONAL,-- Need ON
pucch-ConfigDedicated-v1020    PUCCH-ConfigDedicated-v1020
     OPTIONAL,              -- Need ON
pusch-ConfigDedicated-v1020    PUSCH-ConfigDedicated-v1020
     OPTIONAL,              -- Need ON
schedulingRequestConfig-v1020   SchedulingRequestConfig-v1020
     OPTIONAL,              -- Need ON
soundingRS-UL-ConfigDedicated-v1020
SoundingRS-UL-ConfigDedicated-v1020    OPTIONAL,         -- Need ON
soundingRS-UL-ConfigDedicatedAperiodic-r10
SoundingRS-UL-ConfigDedicatedAperiodic-r10   OPTIONAL,   -- Need ON
uplinkPowerControlDedicated-v1020       UplinkPowerControlDedicated-v1020
     OPTIONAL  -- Need ON
  ]]
}
```

Referring to Table 9, the primary cell ID field may be used as a parameter that replaces the existing physical cell ID for specific purposes (e.g., e-PDCCH setting, PDSCH setting, UE-specific RS setting, or serving point indication for CoMP).

That is, according to an embodiment of the present invention, information on the primary physical cell ID may be transmitted to the terminal by using a method of adding the primary cell ID field and/or primary cell indicator to be used for specific purposes (e.g., e-PDCCH setting, PDSCH setting, UE-specific RS setting, or serving point indication for CoMP) to PhysicalConfigDedicated IE.

According to another embodiment of the present invention, in Table 10, a primary cell indicator may be added which indicates one of a number of CSI-RS resources, which corresponds to the primary CSI-RS resource, while configuring the CSI-RS resources, instead of the primary cell ID field. At this time, the cell ID corresponding to the primary CSI-RS resource is PPCI.

TABLE 10

```
PhysicalConfigDedicated ::=           SEQUENCE {
Primary cell indicator       (0~N-1)                  OPTIONAL
pdsch-ConfigDedicated        PDSCH-ConfigDedicated    OPTIONAL,-- Need ON
pucch-ConfigDedicated        PUCCH-ConfigDedicated    OPTIONAL,-- Need ON
pusch-ConfigDedicated        PUSCH-ConfigDedicated    OPTIONAL,-- Need ON
uplinkPowerControlDedicated  UplinkPowerControlDedicated        OPTIONAL,
     -- Need ON
tpc-PDCCH-ConfigPUCCH        TPC-PDCCH-Config         OPTIONAL,-- Need ON
tpc-PDCCH-ConfigPUSCH        TPC-PDCCH-Config         OPTIONAL,-- Need ON
cqi-ReportConfig             CQI-ReportConfig         OPTIONAL,--Cond CQI-r8
soundingRS-UL-ConfigDedicated   SoundingRS-UL-ConfigDedicated
     OPTIONAL,            -- Need ON
     antennaInfo             CHOICE {
          explicitValue           AntennaInfoDedicated,
          defaultValue            NULL
     }   OPTIONAL,                                     -- Cond AI-r8
schedulingRequestConfig      SchedulingRequestConfig  OPTIONAL, -- Need ON
...,
[[cqi-ReportConfig-v920      CQI-ReportConfig-v920    OPTIONAL,--Cond CQI-r8
antennaInfo-v920   AntennaInfoDedicated-v920          OPTIONAL-- Cond AI-r8 ]],
     [[   antennaInfo-r10            CHOICE {
              explicitValue-r10           AntennaInfoDedicated-r10,
              defaultValue                NULL
         }   OPTIONAL,                                 -- Cond AI-r10
antennaInfoUL-r10          AntennaInfoUL-r10         OPTIONAL,-- Need ON
cif-Presence-r10           BOOLEAN                   OPTIONAL,-- Need ON
cqi-ReportConfig-r10       CQI-ReportConfig-r10   OPTIONAL,-- Cond CQI-r10
for (allocating N multiple CSI-RS){csi-RS-Config-r10          CSI-RS-Config-
r10<-includinig cell ID        OPTIONAL,-- Need ON}
pucch-ConfigDedicated-v1020    PUCCH-ConfigDedicated-v1020
     OPTIONAL,              -- Need ON
pusch-ConfigDedicated-v1020    PUSCH-ConfigDedicated-v1020
     OPTIONAL,              -- Need ON
schedulingRequestConfig-v1020   SchedulingRequestConfig-v1020
     OPTIONAL,              -- Need ON
soundingRS-UL-ConfigDedicated-v1020
SoundingRS-UL-ConfigDedicated-v1020    OPTIONAL,         -- Need ON
soundingRS-UL-ConfigDedicatedAperiodic-r10
```

TABLE 10-continued

```
SoundingRS-UL-ConfigDedicatedAperiodic-r10   OPTIONAL,           -- Need ON
uplinkPowerControlDedicated-v1020        UplinkPowerControlDedicated-v1020
    OPTIONAL   -- Need ON
   ]]
}
```

Figure 16:
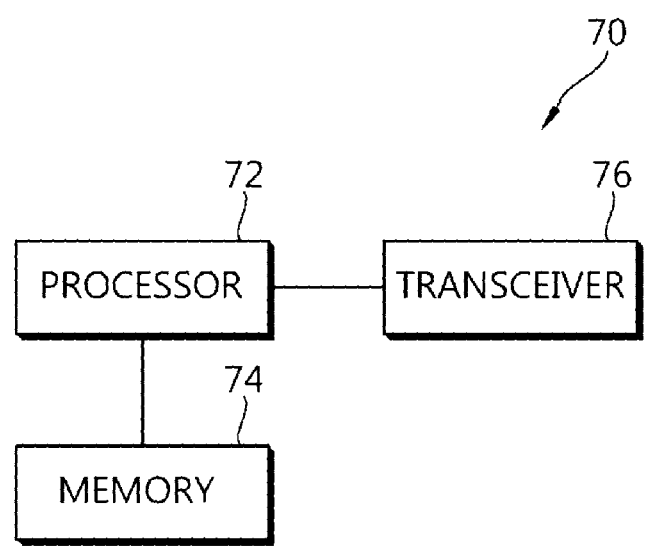
FIG. 16 is a block diagram illustrating a wireless apparatus according to an embodiment of the present invention.

FIG. 16 is a block diagram illustrating a wireless apparatus according to an embodiment of the present invention.

The wireless apparatus 70 includes a processor 72, a memory 74, and a transceiver 76. The transceiver 76 transmits/receives a radio signal and has an IEEE 802.11 physical layer installed therein. The processor 72 is functionally connected to the transceiver 76 to implement the IEEE 802.11 MAC layer and physical layer. According to an embodiment of the present invention, the processor 72 may determine a node from which control information is to be received over an e-PDCCH (enhanced physical downlink control channel) based on information indicating a primary physical cell ID (identification) obtained through an RRC (radio resource control) message received through the transceiver 76. Further, the processor 72 may be configured to implement the above-described embodiments of the present invention, e.g., the operation for producing the primary physical cell ID.

The processor 72 and/or the transceiver 76 may include ASIC (application-specific integrated circuits), other chipsets, logic circuits, and/or data processing devices. The memory 74 may include a ROM (read-only memory), a RAM (random access memory), a flash memory, a memory card, a storage medium, and/or other storage devices. When implemented in software, the above-described schemes may be embodied in modules (procedures or functions) that perform the above-described functions. The modules may be stored in the memory 74 and may be executed by the processor 72. The memory 74 may be positioned in or outside the processor 72, and may be connected to the processor 72 by well-known various means.

What is claimed is:

1. A method for performing blind decoding in a wireless communication system, the method comprising:
   performing, by a user equipment (UE), a first blind decoding in a cell-specific search space on a cell for detecting a Physical Downlink Control Channel (PDCCH);
   receiving, by the UE, a Radio Resource Control (RRC) message including information on a UE-specific search space, for monitoring an enhanced-PDCCH (EPDCCH) and identity information; and
   performing, by the UE, a second blind decoding in the UE-specific search on the cell for detecting the EPDCCH,
   wherein the PDCCH is demodulated based on a physical cell identity of the cell,
   wherein the EPDCCH is demodulated based on the identity information, and
   wherein the identity information used to demodulate the EPDCCH is different from the physical cell identity used to demodulate the PDCCH.

2. The method of claim 1,
   wherein the cell-specific search space and the UE-specific search space are defined in one subframe, which includes a plurality of orthogonal frequency division multiplexing (OFDM) symbols, and
   wherein first OFDM symbols for the cell-specific search space among the plurality of OFDM symbols precede second OFDM symbols for the UE-specific search space among the plurality of OFDM symbols.

3. The method of claim 1,
   wherein the physical cell identity is used to decode a channel state information-reference signal (CSI-RS) when the RRC message does not further include another identity information to decode the CSI-RS, and
   wherein the physical cell identity is not used to decode the CSI-RS when the RRC message further includes the another identity information to decode the CSI-RS.

4. The method of claim 1, further comprising:
   receiving, by the user equipment, synchronization signals on the cell; and
   acquiring, by the user equipment, the physical cell identity of the cell based on the synchronization signals.

5. The method of claim 4, wherein the synchronization signals include a primary synchronization signal and a secondary synchronization signal.

6. A wireless apparatus configured for performing blind decoding in a wireless communication system, the wireless apparatus comprising:
   a transceiver configured to receive radio signals; and
   a processor operatively coupled with the transceiver and configured to:
      perform a first blind decoding in a cell-specific search space on a cell for detecting a Physical Downlink Control Channel (PDCCH),
      control the transceiver to receive a Radio Resource Control (RRC) message including information on a user equipment (UE)-specific search space, for monitoring an enhanced-PDCCH (EPDCCH) PDCCH, and identity information, and
      perform a second blind decoding in the UE-specific search space on the cell for detecting the EPDCCH,
   wherein the PDCCH is demodulated based on a physical cell identity of the cell,
   wherein the EPDCCH is demodulated based on the identity information, and
   wherein the identity information used to demodulate the EPDCCH is different from the physical cell identity used to demodulate the PDCCH.

7. The wireless apparatus of claim 6,
   wherein the cell-specific search space and the UE-specific search space are defined in one subframe, which includes a plurality of orthogonal frequency division multiplexing (OFDM) symbols, and
   wherein first OFDM symbols for the cell-specific search space among the plurality of OFDM symbols precede second OFDM symbols for the UE-specific search space among the plurality of OFDM symbols.

8. The wireless apparatus of claim 6,
   wherein the physical cell identity is used to decode a channel state information-reference signal (CSI-RS) when the RRC message does not further include another identity information to decode the CSI-RS, and wherein the physical cell identity is not used to decode the CSI-RS when the RRC message further includes the another identity information to decode the CSI-RS.

9. The wireless apparatus of claim 6, wherein the processor is further configured to:
control the transceiver to receive synchronization signals on the cell; and
acquire the physical cell identity of the cell based on the synchronization signals.

10. The wireless apparatus of claim 9, wherein the synchronization signals include a primary synchronization signal and a secondary synchronization signal.

* * * * *